(12) United States Patent
Eguchi et al.

(10) Patent No.: US 7,770,195 B2
(45) Date of Patent: Aug. 3, 2010

(54) INFORMATION PROCESSING APPARATUS AND METHOD, INFORMATION PROVIDING APPARATUS AND METHOD, AND PROGRAM THEREOF

(75) Inventors: Tatsuo Eguchi, Kanagawa (JP); Yoshikazu Watanabe, Kanagawa (JP); Nobuaki Yamaguchi, Kanagawa (JP); Yasuo Nomura, Kanagawa (JP); Yasuhiko Terashita, Kanagawa (JP); Atsushi Kimura, Tokyo (JP); Yasuhito Shikata, Tokyo (JP); Keisuke Ohmori, Kanagawa (JP); Takashi Yoshida, Tokyo (JP)

(73) Assignee: Sony Corporation, Tokyo (JP)

( * ) Notice: Subject to any disclaimer, the term of this patent is extended or adjusted under 35 U.S.C. 154(b) by 1595 days.

(21) Appl. No.: 10/138,767

(22) Filed: May 3, 2002

(65) Prior Publication Data

US 2003/0028876 A1 Feb. 6, 2003

(30) Foreign Application Priority Data

| May 7, 2001 | (JP) | ............................. 2001-136630 |
| May 7, 2001 | (JP) | ............................. 2001-136631 |
| May 7, 2001 | (JP) | ............................. 2001-136632 |
| May 7, 2001 | (JP) | ............................. 2001-136633 |

(51) Int. Cl.
*H04N 5/445* (2006.01)
*G06F 3/00* (2006.01)
*G06F 13/00* (2006.01)
*H04N 7/173* (2006.01)

(52) U.S. Cl. ............................. 725/49; 725/46; 725/115

(58) Field of Classification Search ............. 725/39–61, 725/115
See application file for complete search history.

(56) References Cited

U.S. PATENT DOCUMENTS

| 5,589,892 | A | * | 12/1996 | Knee et al. ..................... 725/43 |
| 5,659,350 | A | * | 8/1997 | Hendricks et al. ........... 725/116 |
| 5,808,694 | A | * | 9/1998 | Usui et al. ..................... 725/49 |
| 5,946,052 | A | * | 8/1999 | Ozkan et al. ................. 348/555 |
| 6,020,880 | A | * | 2/2000 | Naimpally ................... 725/48 |

(Continued)

FOREIGN PATENT DOCUMENTS

JP     A 10-276413     10/1998

(Continued)

OTHER PUBLICATIONS

Japanese Office Action dated Oct. 20, 2009.

*Primary Examiner*—Dominic D Saltarelli
(74) *Attorney, Agent, or Firm*—Frommer Lawrence & Haug LLP; William S. Frommer; Ellen Marcie Emas

(57) ABSTRACT

Disclosed are an information processing apparatus and an information processing method, an information providing apparatus and an information providing method, and a program thereof. In an information processing apparatus, the apparatus comprises: an acquiring element for acquiring a file which includes channel data denoting numbers and names of channels of TV programs distributed by a provider and which corresponds to the provider; a generating element for generating internal data based on the channel data in the acquired file, the generated internal data specifying the numbers and names of the channels; and a reception controlling element for controlling reception of the TV programs by selecting the channels based on the internal data.

9 Claims, 38 Drawing Sheets

U.S. PATENT DOCUMENTS

| | | | |
|---|---|---|---|
| 6,268,849 B1 * | 7/2001 | Boyer et al. | 725/40 |
| 6,271,893 B1 * | 8/2001 | Kawaguchi et al. | 348/725 |
| 7,086,076 B1 * | 8/2006 | Park | 725/50 |
| 2003/0208760 A1 * | 11/2003 | Sugai et al. | 725/50 |

FOREIGN PATENT DOCUMENTS

| | | |
|---|---|---|
| JP | A 11-196342 | 7/1999 |
| JP | A 11-284962 | 10/1999 |
| JP | A 11-284963 | 10/1999 |

* cited by examiner

FIG. 11

```
Content-type:application/x-tv-channel-info
version:2 //CURRENT VERSION NO.
zipcode:95134 //ZIP CODE
providers:ZS&S CABLE SERVICES-SAN JOSE-Lineup A //PROVIDER'S NAME
broadcast-type:cable //TYPE OF PROGRAM DISTRIBUTION
                     (ANTENNA, CABLE, OR SATELLITE)
station-desc:
1,KONJO,0,Sports //CHANNEL NO., TV STATION NAME, FAVORITE FLAG, GENRE
```

FIG. 12

```
Content-type:application/x-tv-channel-info
version:2
zipcode:95050
providers:BU&U CABLE SERVICES,SANTA CLARA
broadcast-type:cable
station-desc:
1, FEATURE FILMS, 1, 0...
3, BULLETIN BOARDS, 1, 0...
4, THIS WEEK'S HITS, 1, 0...
6, TRENDY DRAMAS, 1, 0...
8, NEWS, 1, 0...
10, COMEDIES, 1, 0...
12, VARIETY SHOWS, 1, 0...
46, OVERSEAS NEWS, 1, 0...
42, CLASSICAL MUSIC, 1, 0...
38, BACKGROUND VIDEOS, 1, 0...
```

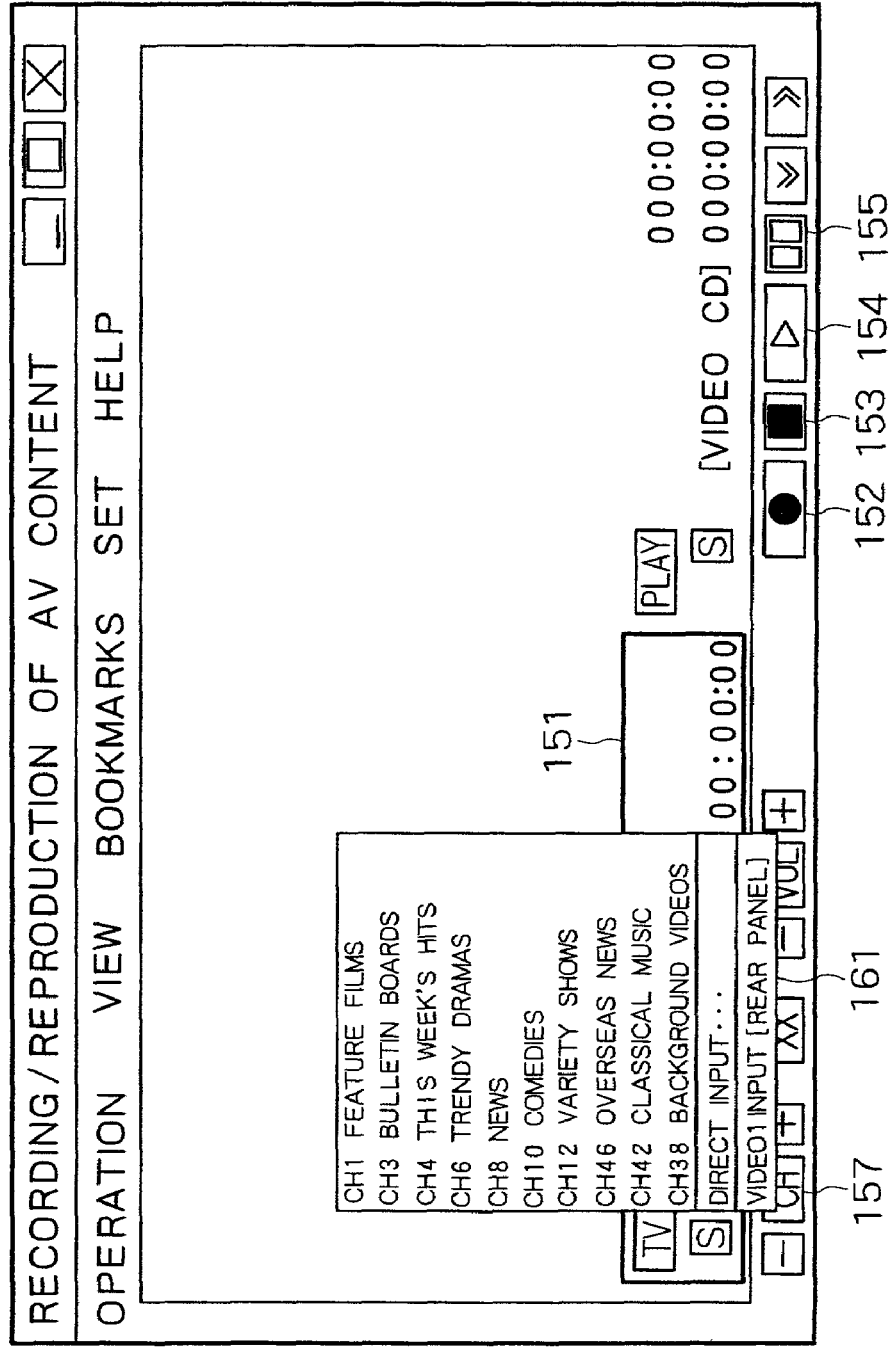

FIG. 14

```
Content-type:application/x-tv-channel-info
version:2
zipcode:95050
providers:BU&U CABLE SERVICES,SANTA CLARA
broadcast-type:cable
station-desc:
1, FEATURE FILMS, 1, 0···
3, BULLENTIN BOARDS, 1, 0···
4, THIS WEEK'S HITS, 1, 0···
6, TRENDY DRAMAS, 1, 0···
7, MIDSUMMER NIGHT'S GHOST STORIES(NEW!), 1, 0···
8, NEWS, 1, 0···
10, COMEDIES, 1, 0···
12, VARIETY SHOWS,1, 0···
46, OVERSEAS NEWS, 1, 0···
42, CLASSICAL MUSIC 1, 0··
38, BACKGROUND VIDEOS, 1, 0···
```

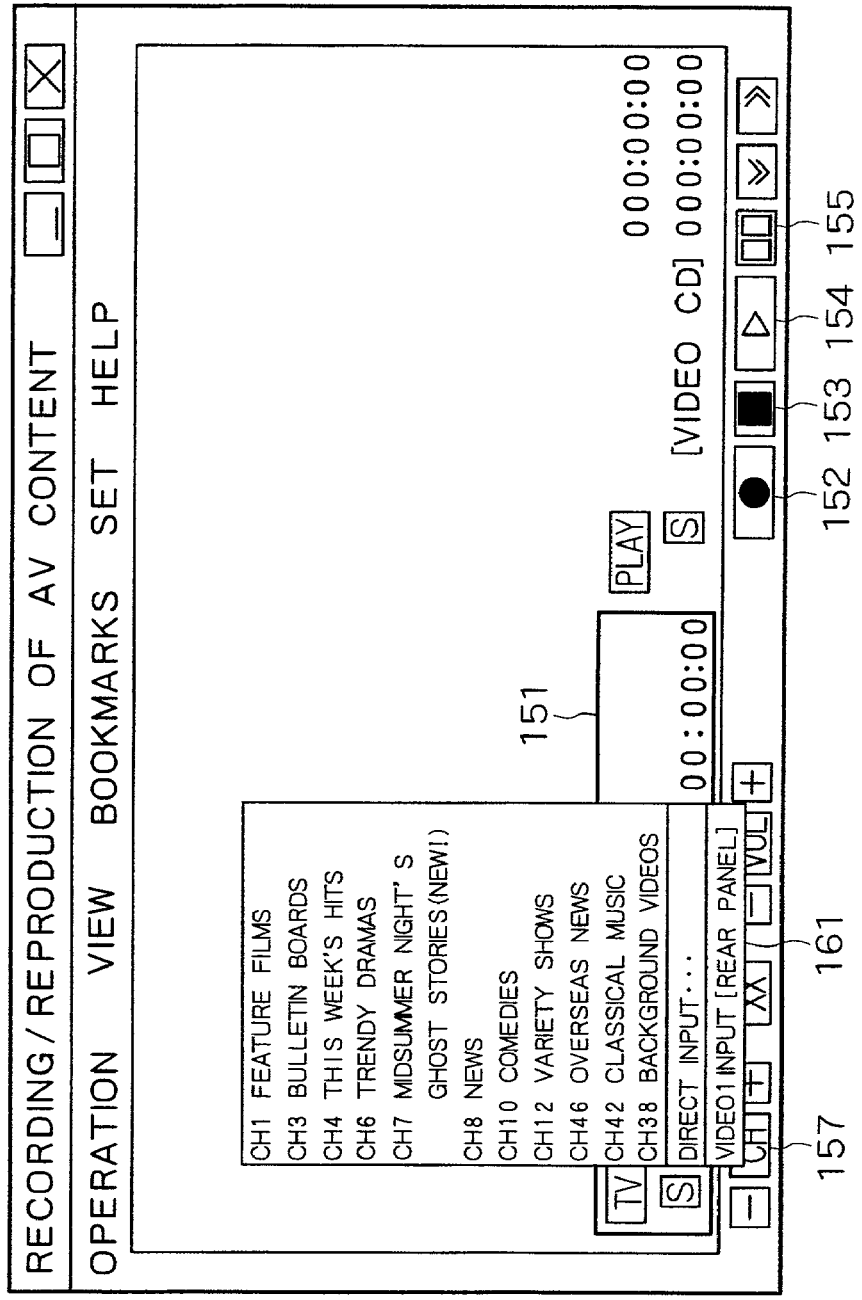

FIG.16

CHANNEL SETTINGS

LIST OF REGISTERED CHANNELS

| RECEIVED CHANNELS... | REMOTE SETTINGS | FAVORITES | CHANNEL NAMES |
|---|---|---|---|
| 1 | 1 | ↙ | FEATURE FILMS |
| 3 | 3 | ↙ | BULLETIN BOARDS |
| 4 | 4 | ↙ | THIS WEEK'S HITS |
| 6 | 6 | ↙ | TRENDY DRAMAS |
| 8 | 8 | ↙ | NEWS |
| 10 | 10 | ↙ | COMEDIES |
| 12 | 12 | ↙ | VARIETY SHOWS |
| 46 | 2 | ↙ | OVERSEAS NEWS |
| 42 | 5 | ↙ | CLASSICAL MUSIC |
| 38 | 7 | ↙ | BACKGROUND VIDEOS |

ADD… CHANGE… ERASE… UP DOWN

OK CANCEL HELP

FIG. 19

```
Content-type:application/x-tv-channel-info
version:2
zipcode:95050
providers:BU&U CABLE SERVICES,SANTA CLARA
broadcast-type:cable
station-desc:
1, FEATURE FILMS, 0···
3, BULLENTIN BOARDS, 0···
4, THIS WEEK'S HITS, 0···
6, TRENDY DRAMAS, 0···
7, MIDSUMMER NIGHT'S GHOST STORIES(NEW!), 1, 0···
8, NEWS, 0···
10, COMEDIES, 0···
12, VARIETY SHOWS, 0···
46, OVERSEAS NEWS, 0···
42, CLASSICAL MUSIC, 0··
38, BACKGROUND VIDEOS, 0···
```

FIG.26

```
Content-type:application/x-tv-channel-info
version:2
zipcode:95050
providers:BU&U CABLE SERVICES,SANTA CLARA
broadcast-type:cable
station-desc:
1, FEATURE FILMS, 5, 0···
3, BULLETIN BOARDS, 2, 0···
4, THIS WEEK'S HITS, 5, 0···
6, TRENDY DRAMAS, 3, 0···
8, NEWS, 4, 0···
10, COMEDIES, 3, 0···
12, VARIETY SHOWS, 4, 0···
46, OVERSEAS NEWS, 4, 0···
42, CLASSICAL MUSIC, 1, 0···
38, BACKGROUND VIDEOS, 5, 0···
```

F I G. 30
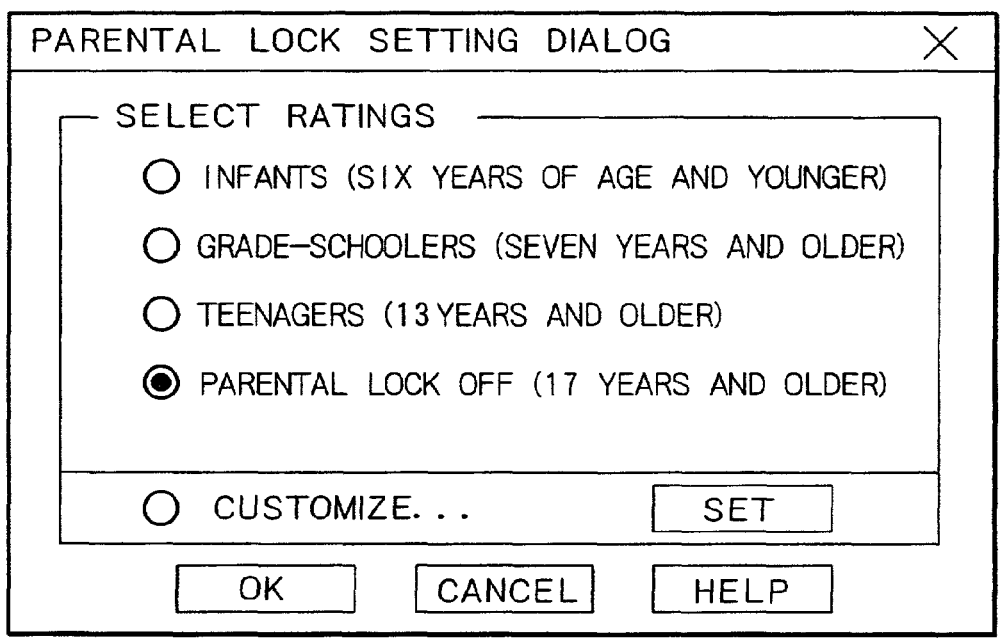

INFORMATION PROCESSING APPARATUS AND METHOD, INFORMATION PROVIDING APPARATUS AND METHOD, AND PROGRAM THEREOF

BACKGROUND OF THE INVENTION

The present invention relates to an information processing apparatus and an information processing method, an information providing apparatus and an information providing method, and a program thereof. More particularly, the invention relates to an information processing apparatus and an information processing method, an information providing apparatus and an information providing method, and a program thereof for controlling the reception of TV programs.

Personal computers each equipped with a tuner board have gained widespread acceptance in the past few years. These PCs are capable of receiving broadcast TV programs from a provider and displaying images of the received TV programs on their monitor accompanied by sounds.

One disadvantage of such personal computers is that if broadcast channel assignments are changed on the side of the provider, the user at each personal computer must change the necessary PC settings. This can be a bothersome, time-consuming chore.

SUMMARY OF THE INVENTION

The present invention has been made in view of the above circumstances and provides an information processing apparatus and an information processing method, an information providing apparatus and an information providing method, and a program thereof allowing a personal computer or the like to keep receiving TV programs by quickly updating internal settings to reflect varying broadcast channel assignments, without requiring users to perform complicated corrective operations.

To achieve the above object, according to a first aspect of the present invention, there is provided an information processing apparatus including: acquiring means for acquiring a file which includes channel data denoting numbers and names of channels of TV programs distributed by a provider and which corresponds to the provider; generating means for generating internal data based on the channel data in the acquired file, the generated internal data specifying the numbers and names of the channels; and reception controlling means for controlling reception of the TV programs by selecting the channels based on the internal data.

According to a second aspect of the present invention, there is provided an information processing method including the steps of: acquiring a file which includes channel data denoting numbers and names of channels of TV programs distributed by a provider and which corresponds to the provider; generating internal data based on the channel data in the acquired file, the generated internal data specifying the numbers and names of the channels; and controlling reception of the TV programs by selecting the channels based on the internal data.

According to a third aspect of the present invention, there is provided a program which causes a computer to carry out the steps of: acquiring a file which includes channel data denoting numbers and names of channels of TV programs distributed by a provider and which corresponds to the provider; generating internal data based on the channel data in the acquired file, the generated internal data specifying the numbers and names of the channels; and controlling reception of the TV programs by selecting the channels based on the internal data.

With these configurations, a file is first acquired which includes channel data denoting numbers and names of channels of TV programs distributed by a provider and which corresponds to that provider. Based on the channel data in the acquired file, internal data are generated to specify the numbers and names of the channels. Reception of the TV programs is controlled by selecting the channels in keeping with the internal data. Accordingly, the user is allowed to receive desired TV programs easily and quickly based on the generated internal data including any altered channel assignments that may have occurred; there is no need for the user to perform complicated operations to deal with the changed channels.

According to a fourth aspect of the present invention, there is provided an information processing apparatus including: display controlling means for controlling display of an image based on numbers and names of channels of TV programs distributed by a provider as well as on internal data specifying the numbers and names of selected channels among the channels, the image showing the numbers and names of the channels of the TV programs distributed by the provider as well as an indication of whether or not each of the channels is selected; updating means for updating the internal data based on channel selection settings made by a user; and reception controlling means for controlling reception of the TV programs by selecting the channels based on the internal data.

According to a fifth aspect of the present invention, there is provided an information processing method including the steps of: controlling display of an image based on numbers and names of channels of TV programs distributed by a provider as well as on internal data specifying the numbers and names of selected channels among the channels, the image showing the numbers and names of the channels of the TV programs distributed by the provider as well as an indication of whether or not each of the channels is selected; updating the internal data based on channel selection settings made by a user; and controlling reception of the TV programs by selecting the channels based on the internal data.

According to a sixth aspect of the present invention, there is provided a program which causes a computer to carry out the steps of: controlling display of an image based on numbers and names of channels of TV programs distributed by a provider as well as on internal data specifying the numbers and names of selected channels among the channels, the image showing the numbers and names of the channels of the TV programs distributed by the provider as well as an indication of whether or not each of the channels is selected; updating the internal data based on channel selection settings made by a user; and controlling reception of the TV programs by selecting the channels based on the internal data.

With these configurations, display of an image is controlled based on numbers and names of channels of TV programs distributed by a provider as well as on internal data specifying the numbers and names of selected channels among the channels, the image showing the numbers and names of the channels of the TV programs distributed by the provider as well as an indication of whether or not each of the channels is selected. The user selects preferred channels from among those displayed. The internal data are updated based on the channel selection settings made by the user. Reception of the TV programs is controlled by selecting the channels based on the internal data thus updated. Accordingly, it is made possible that the user may choose desired TV programs quickly from a large number of available TV channels.

According to a seventh aspect of the present invention, there is provided an information providing apparatus including: retaining means for retaining a file which includes channel data denoting numbers and names of channels of TV programs distributed by a provider and which corresponds to the provider; and transmission controlling means for controlling transmission of the file to an information processing apparatus.

According to an eighth aspect of the present invention, there is provided an information providing method including the steps of: retaining a file which includes channel data denoting numbers and names of channels of TV programs distributed by a provider and which corresponds to the provider; and controlling transmission of the file to an information processing apparatus.

According to a ninth aspect of the present invention, there is provided a program which causes a computer to carry out the steps of: retaining a file which includes channel data denoting numbers and names of channels of TV programs distributed by a provider and which corresponds to the provider; and controlling transmission of the file to an information processing apparatus.

With these configurations, a file is retained which includes channel data denoting numbers and names of channels of TV programs distributed by a provider and which corresponds to that provider. The file thus retained is transmitted to an information processing apparatus. Accordingly, the information processing apparatus is allowed to receive TV programs without delay based on the channel data including any changed channel assignments that may have occurred.

According to a tenth aspect of the present invention, there is provided an information processing apparatus including: first reception controlling means for controlling reception of a file which includes channel data denoting numbers and names of channels of TV programs distributed by a provider and which corresponds to the provider; and second reception controlling means for controlling reception of the TV programs based on the received file.

According to an eleventh aspect of the present invention, there is provided an information processing method including the steps of: firstly controlling reception of a file which includes channel data denoting numbers and names of channels of TV programs distributed by a provider and which corresponds to the provider; and secondly controlling reception of the TV programs based on the received file.

According to a twelfth aspect of the present invention, there is provided a program which causes a computer to carry out the steps of: firstly controlling reception of a file which includes channel data denoting numbers and names of channels of TV programs distributed by a provider and which corresponds to the provider; and secondly controlling reception of the TV programs based on the received file.

With these configurations, a file is received which includes channel data denoting numbers and names of channels of TV programs distributed by a provider and which corresponds to that provider. Reception of the TV programs is controlled based on the received file. Accordingly, the reception is permitted without delay of the TV programs based on the file data including any changed channel assignments that may have occurred.

According to a thirteenth aspect of the present invention, there is provided an information providing apparatus including: file generating means for generating a file which includes numbers and names of channels of TV programs distributed by a provider as well as data denoting priorities of the channels; and transmission controlling means for controlling transmission of the file to a recipient.

According to a fourteenth aspect of the present invention, there is provided an information providing method including the steps of: generating a file which includes numbers and names of channels of TV programs distributed by a provider as well as data denoting priorities of the channels; and controlling transmission of the file to a recipient.

According to a fifteenth aspect of the present invention, there is provided a program which causes a computer to carry out the steps of: generating a file which includes numbers and names of channels of TV programs distributed by a provider as well as data denoting priorities of the channels; and controlling transmission of the file to a recipient.

With these configurations, a file is generated which includes numbers and names of channels of TV programs distributed by a provider as well as data denoting priorities of the channels. The file is transmitted to a recipient ready to receive the TV programs from the provider. Accordingly, the recipient is prompted preferentially to view the TV programs distributed by the provider in question.

According to a sixteenth aspect of the present invention, there is provided an information processing apparatus administered by a TV program supplier supplying TV programs to a provider, the apparatus including: transmission controlling means for controlling transmission of data which correspond to channels of the supplied TV programs and which denote priorities of the channels for a recipient receiving the TV programs from the provider; and executing means for executing a process of paying a fee to an administrator of the information processing apparatus, the fee corresponding to the priorities of the channels denoted by the data.

According to a seventeenth aspect of the present invention, there is provided an information processing method for use with an information processing apparatus administered by a TV program supplier supplying TV programs to a provider, the method including the steps of: controlling transmission of data which correspond to channels of the supplied TV programs and which denote priorities of the channels for a recipient receiving the TV programs from the provider; and executing a process of paying a fee to an administrator of the information processing apparatus, the fee corresponding to the priorities of the channels denoted by the data.

According to an eighteenth aspect of the present invention, there is provided a program which causes a computer of an information processing apparatus administered by a TV program supplier supplying TV programs to a provider, to carry out the steps of: controlling transmission of data which correspond to channels of the supplied TV programs and which denote priorities of the channels for a recipient receiving the TV programs from the provider; and executing a process of paying a fee to an administrator of the information processing apparatus, the fee corresponding to the priorities of the channels denoted by the data.

With these configurations, an information processing apparatus accepts transmitted data which correspond to channels of TV programs supplied by a provider and which denote priorities of the channels for a recipient receiving the TV programs from that provider. A process is then executed to pay a fee to the administrator of the information processing apparatus, the fee corresponding to the priorities of the channels denoted by the data. Accordingly, the recipient is also prompted preferentially to view the TV programs distributed by the provider in question.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is an explanatory view showing a typical structure of a TVCI file;

FIG. 12 is a schematic view indicating another TVCI file;

FIG. 13 is an explanatory view of another typical screen displayed by the recording/reproduction program on the monitor;

FIG. 14 is a schematic view of a TVCI file received by the personal computer from the server;

FIG. 15 is an explanatory view of another typical screen displayed by the recording/reproduction program on the monitor;

FIG. 16 is a schematic view of a typical window in which to set channels;

FIG. 19 is a schematic view of another TVCI file received by the personal computer from the server;

FIG. 26 is a schematic view of another TVCI file received by the personal computer from the server;

FIG. 30 is a schematic view of a typical parental lock setting dialog box;

DESCRIPTION OF THE PREFERRED EMBODIMENTS

Figure 1:
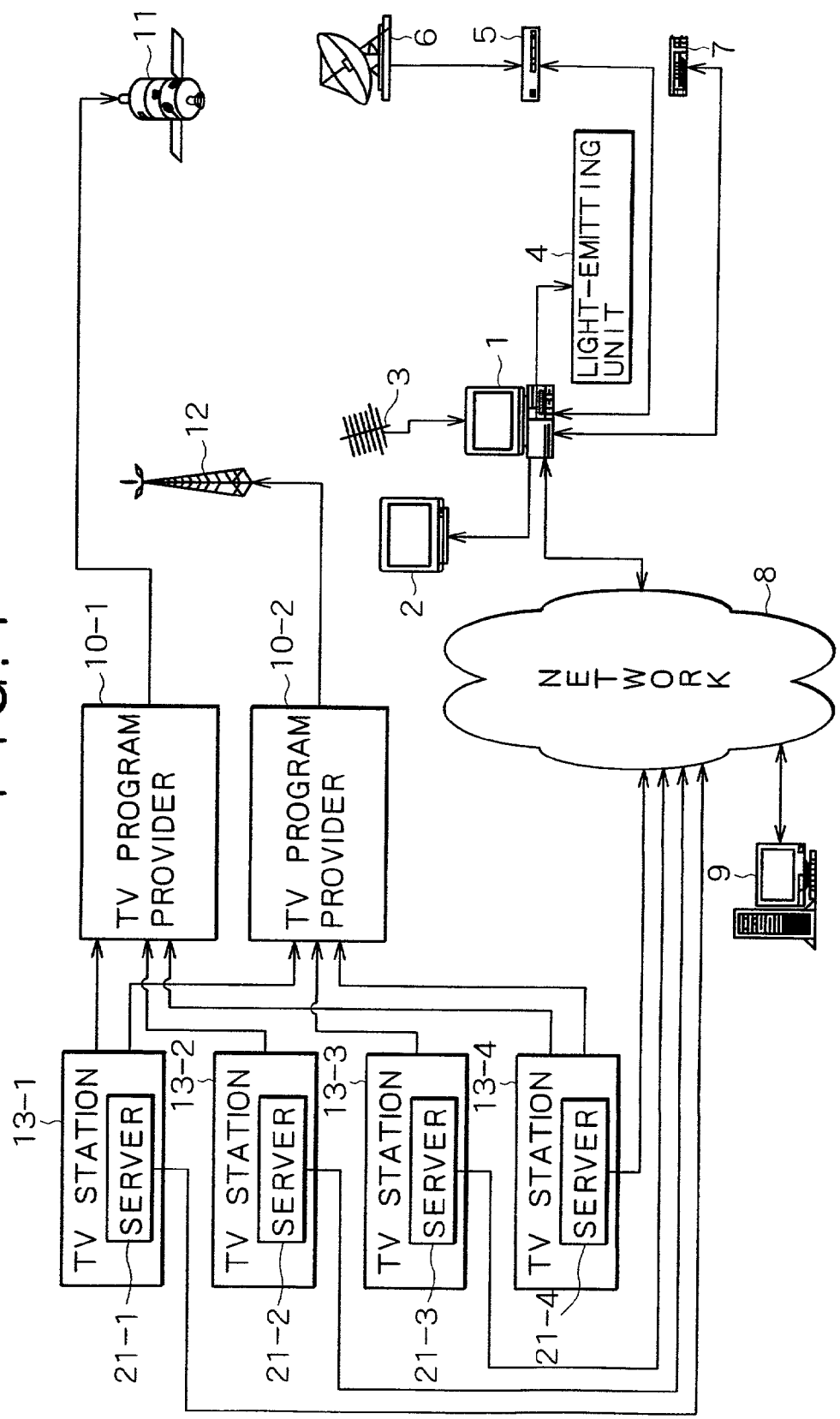
FIG. 1 is a block diagram of a broadcasting system practiced as an embodiment of this invention.

FIG. 1 is a block diagram of a broadcasting system practiced as one preferred embodiment of this invention. In FIG. 1, a personal computer 1 inputs signals from an antenna 3 that receives ground waves transmitted by a TV program provider 10-2. Based on the input signals, the personal computer 1 reproduces images and sounds of received TV programs and records the reproduced images and sounds.

The personal computer 1 also reproduces images and sounds corresponding to analog signals fed from a VCR (Video Cassette Recorder) 7 or to digital data sent through a set-top box 5 over a network 8 based on IEEE (Institute of Electrical and Electronic Engineers) 1394 standards. The images and sounds thus reproduced are recorded in the personal computer 1.

The personal computer 1 then supplies a monitor 2 with the images and sounds of the antenna-received TV programs or those supplied through the set-top box 5 or from the VCR 7. The recorded images and sounds are also fed from storage to the monitor 2.

In response to a user's operation, the personal computer 1 supplies a light-emitting unit 4 with a signal corresponding to a command for operating the set-top box 5 or the VCR 7.

Over the network 8 such as the Internet or a local area network, the personal computer 1 receives a TVCI (TV Channel Information) file, to be described later, from a server 9. In accordance with the received TVCI file, the personal computer 1 selects channels of TV programs to be received via the antenna 3 for reproduction. Also based on the received TVCI file, the personal computer 1 selects channels of TV programs to be received through the set-top box 5.

The monitor 2 displays images based on image signals from the personal computer 1 and outputs sounds based on sound signals therefrom.

The antenna 3 receives ground waves from a given TV station or from the TV program provider 10-2. In turn, the antenna 3 forwards signals corresponding to the received waves to the personal computer 1.

Upon receipt of the signal denoting the command given by the personal computer 1 to operate the set-top box 5 or VCR 7, the light-emitting unit 4 emits a light pattern corresponding to the received command.

The set-top box 5 admits signals from the antenna 6 that receives radio waves transmitted by a TV program provider 10-1 via a satellite 11. Of the input signals, those representing images and sounds of selected TV programs are supplied through the set-top box 5 to the personal computer 1.

The set-top box 5 receives a light pattern emitted by the light-emitting unit 4 corresponding to a given command. On receiving such a command, the set-top box 5 carries out an operation designated by that command.

The antenna 6 receives radio waves transmitted by given TV stations or sent by the TV program provider 10-1 via the satellite 11. The antenna 6 then feeds the set-top box 5 with signals corresponding to the received waves.

The VCR 7 either records to a loaded video cassette the signals representing images and sounds of selected TV programs coming from the personal computer 1, or reproduces the images and sounds of a TV program from the loaded video cassette. The image and sound signals denoting the TV programs thus reproduced are supplied to the personal computer 1.

The VCR 7 receives from the light-emitting unit 4 a light pattern representative of a command for operating the VCR 7. Upon receipt of the light pattern, the VCR 7 performs the operation corresponding to the pattern-designated command.

The server 9 stores a TVCI file which corresponds to each of the TV program providers 10-1 and 10-2 and which includes data on their channels. In response to a request from the personal computer 1, the server 9 sends the requested TVCI file over the network 8 to the personal computer 1.

The TV program provider 10-1 distributes TV programs from TV stations 13-1, 13-2, and 13-4 to the personal computer 1. Illustratively, the TV program provider 10-1 broadcasts via a satellite 11 those programs supplied by the TV stations 13-1, 13-2, and 13-4.

The TV program provider 10-2 distributes TV programs from TV stations 13-1, 13-3, and 13-4 to the personal computer 1. Illustratively, the TV program provider 10-1 broadcasts the TV programs using ground waves via a broadcasting antenna 12.

The TV station 13-1 produces TV programs and supplies the produced programs to the TV program providers 10-1 and 10-2. A server 21-1 of the TV station 13-1 sends data on the channel of the station 13-1 to the server 9 over the network 8. Given the channel data from the server 21-1, the server 9 generates a TVCI file accordingly and transmits the generated file to the personal computer 1. With the TVCI file fed to the personal computer 1, the TV station 13-1 pays a fee to the administrator of the server 9.

The TV station 13-2 produces TV programs and supplies the produced programs to the TV program provider 10-1. A server 21-2 of the TV station 13-2 sends data on the channel of the station 13-2 to the server 9 over the network 8. Given the channel data from the server 21-2, the server 9 generates a TVCI file accordingly and transmits the generated file to the personal computer 1. With the TVCI file fed to the personal computer 1, the TV station 13-2 pays a fee to the administrator of the server 9.

The TV station 13-3 produces TV programs and supplies the produced programs to the TV program provider 10-2. A server 21-3 of the TV station 13-3 sends data on the channel of the station 13-3 to the server 9 over the network 8. Given the channel data from the server 21-3, the server 9 generates a TVCI file accordingly and transmits the generated file to the personal computer 1. With the TVCI file fed to the personal computer 1, the TV station 13-3 pays a fee to the administrator of the server 9.

The TV station 13-4 produces TV programs and supplies the produced programs to the TV program providers 10-1 and 10-2. A server 21-4 of the TV station 13-4 sends data on the channel of the station 13-4 to the server 9 over the network 8. Given the channel data from the server 21-4, the server 9 generates a TVCI file accordingly and transmits the generated file to the personal computer 1. With the TVCI file fed to the personal computer 1, the TV station 13-4 pays a fee to the administrator of the server 9.

In the description that follows, the TV stations 13-1 through 13-4 will be simply called the TV station 13 if there is no need to make distinction therebetween. Likewise the servers 21-1 through 21-4 will be simply called the server 21 if they need not be distinguished from one another.

Figure 2:
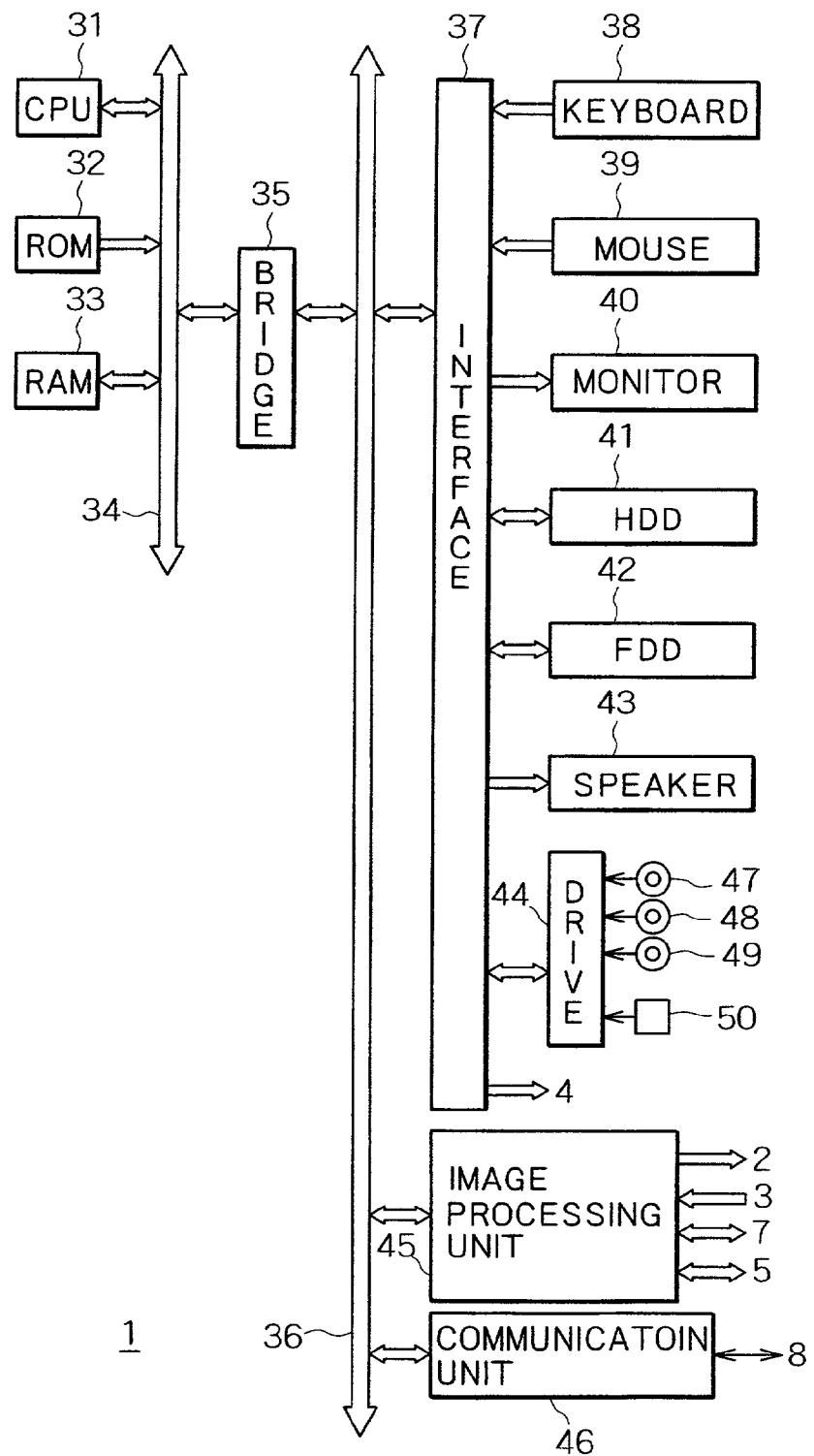
FIG. 2 is a block diagram of a personal computer in the system of FIG. 1.

FIG. 2 is a block diagram outlining a typical structure of the personal computer 1. A CPU (Central Processing Unit) 31 executes an OS (Operating System) and application programs, to be described later, on the computer. A ROM (Read-Only Memory) 32 accommodates basically fixed data as part of the programs and operation parameters used by the CPU 31. A RAM (Random-Access Memory) 33 stores programs executed by the CPU 31 and parameters that are varied as needed during the execution. These component parts are interconnected by a host bus 34 composed of a CPU bus or a memory bus.

The host bus 34 is connected via a bridge 35 to an external bus 36 such as a PCI (Peripheral Component Interconnect/Interface) bus.

A keyboard 38 is operated by a user to enter various commands into the CPU 31. A mouse 39 is manipulated by the user to point to and select items on a monitor 40. The monitor 40 is constituted by a CRT (Cathode Ray Tube) or a LCD (Liquid Crystal Display) displaying diverse kinds of information in text and image. An HDD (Hard Disc Drive) 41 and an FDD (Floppy (registered trademark) Disc Drive) 42 drive a hard disc and a floppy disc respectively so that programs and information to be handled by the CPU 31 may be recorded or reproduced to or from the disc in question. Speakers 43 are provided to reproduce sounds.

A drive 44 reads programs or data from a magnetic disc 47, an optical disc 48, a magneto-optical disc 49, or a semiconductor memory 50 loaded in the drive. The retrieved programs or data are installed into the personal computer 1 or supplied to the CPU 31 or RAM 33.

The components ranging from the keyboard 38 to the drive 44 plus the light-emitting unit 4 are connected to an interface 37. In turn, the interface 37 is connected to the CPU 31 via the external bus 36, bridge 35, and host bus 34.

An image processing board 45 under control of the CPU 31 generates image and sound data based on signals coming from the antenna 3, on image and sound analog signals from the VCR 7, or on image and sound digital data from the set-top box 5. The image and sound data thus generated are output to the HDD 41 over the external bus 36 and through the interface 37.

Under control of the CPU 31, the image processing board 45 feeds the monitor 2 either with the image and sound analog signals coming from the VCR 7, or with the image and sound analog signals generated based on the signals from the antenna 3 or on the image and sound digital data from the set-top box 5.

Furthermore, the image processing board 45 inputs image and sound data from the HDD 41 over the external bus 36 and through the interface 37, generates analog signals corresponding to the input image and sound data, and supplies the analog signals thus generated to the monitor 2 or to the VCR 7. Alternatively the image processing board 45 generates digital data corresponding to the input image and sound data and supplies the generated digital data to the VCR 7.

The image processing board 45 is connected to the CPU 31 via the external bus 36, bridge 35, and host bus 34.

A communication unit 46 sends a request for desired data to the server 9 and receives the requested data transmitted by the server 9. The received data are fed by the communication unit 46 either to the HDD 41 through the external bus 36 and interface 37 or to the CPU 31 via the external bus 36, bridge 35, and host bus 34.

The communication unit 46 is connected to the CPU 31 through the external bus 36, bridge 35, and host bus 34.

Figure 3:
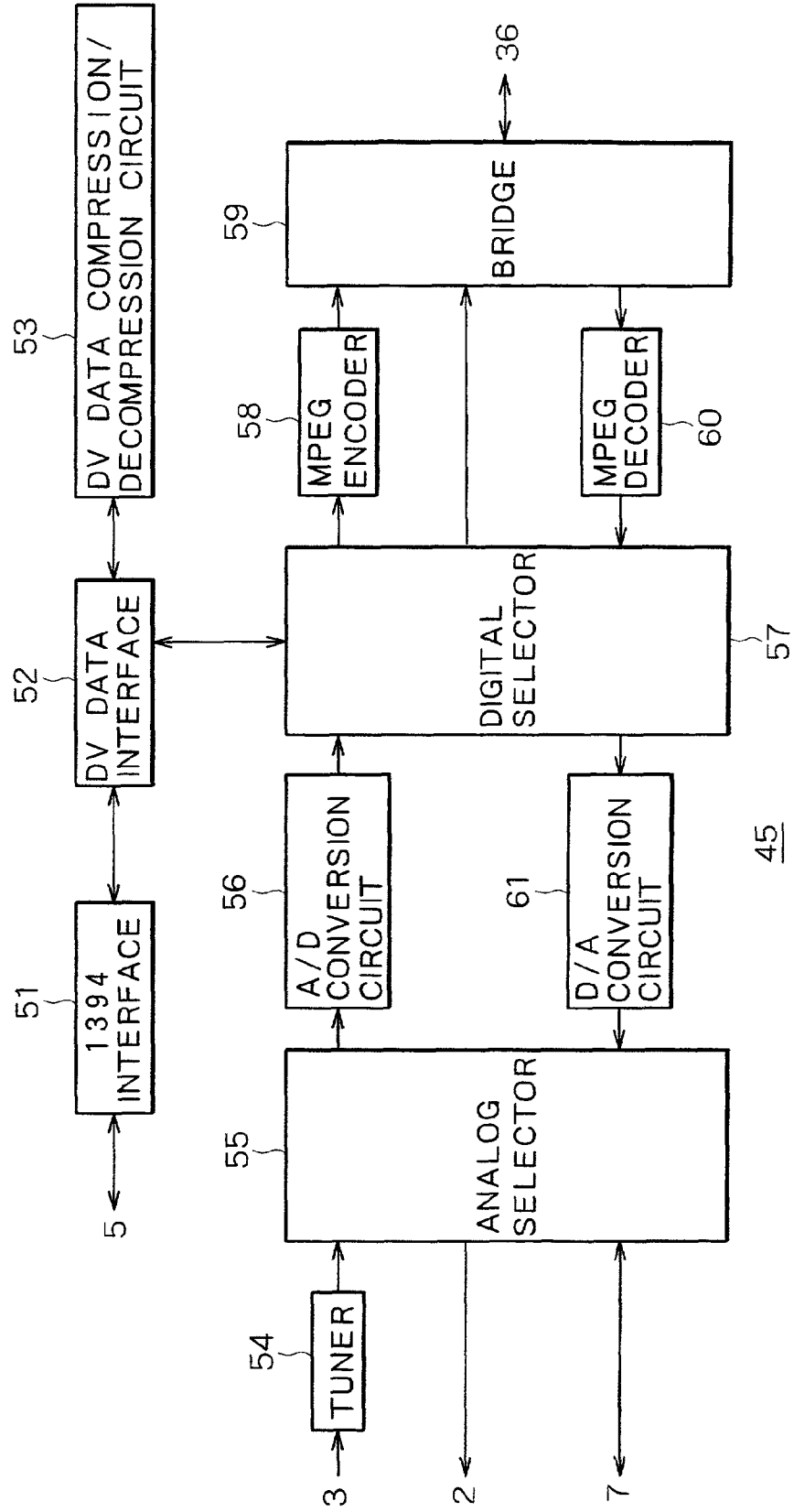
FIG. 3 is a block diagram of an image processing board in the personal computer of FIG. 2.

What follows is a description of how the image processing board 45 is illustratively structured. FIG. 3 is a block diagram showing a typical structure of the image processing board 45. In FIG. 3, a 1394 interface 51 complies with the IEEE 1394 standards, and based on an IEEE 1394-compatible protocol, receives image and sound digital data illustratively in DVCR format from the set-top box 5, and forwards the received data to a DV (Digital Video) data interface 52.

The 1394 interface 51 receives image and sound digital data in DVCR format from the DV data interface 52 and supplies the received data to the set-top box 5 in accordance with the IEEE 1394-compatible protocol.

The DV data interface 52 receives either image and sound digital data in DVCR format from the 1394 interface 51 or image and sound digital data from a digital selector 57 (e.g., uncompressed digital data such as 4:1:1 data). The data thus received are forwarded to a DV data compression/decompression circuit 53. On receiving image and sound digital data in DVCR format from the DV data compression/decompression circuit 53, the DV data interface 52 forwards the received data to the 1394 interface 51. Given the image and sound digital data (uncompressed data) from the DV data compression/decompression circuit 53, the DV data interface 53 forwards the data to the digital selector 57.

When receiving image and sound digital data in DVCR format from the DV data interface 52, the DV data compression/decompression circuit 53 decompresses the received data and outputs the decompressed image and sound digital data to the DV data interface 52. Upon receipt of uncompressed image and sound digital data from the DV data interface 52, the DV data compression/decompression circuit 53 compresses the received data and outputs the compressed image and sound digital data in DVCR format to the DV data interface 52.

A tuner 54 inputs RF (Radio Frequency) signals from the antenna 3 and outputs to an analog selector 55 image and sound analog signals which, based on the RF signals, are provided over specific channels. The analog selector 55 selects the image and sound analog signals from the tuner 54, from the VCR 7, or from a D/A (Digital/Analog) conversion circuit 61. The selected analog signals are output by the analog selector 55 to an A/D (Analog/Digital) conversion circuit 56, to the monitor 2, or to the VCR 7.

The A/D conversion circuit 56 converts the image and sound analog signals from the analog selector 55 into digital data (e.g., image data such as 4:1:1 data) and outputs the converted data to the digital selector 57. On receiving image and sound digital data from the DV data interface 52, from the A/D conversion circuit 56, and from an MPEG (Moving Picture Experts Group) decoder 60, the digital selector 57 selects the data from one of the sources and outputs the selected digital data to the DV data interface 52, to an MPEG encoder 58, or to the D/A conversion circuit 61. The digital selector 57 also outputs scene switchover location information to a bridge 59.

The MPEG encoder 58 compresses the image and sound digital data from the digital selector 57 into MPEG-format digital data and outputs the compressed data to the bridge 59. The MPEG encoder 58 further converts a scene switchover image into a still image and outputs the resulting still image to the bridge 59.

The bridge 59 receives image and sound digital data (uncompressed data) from the digital selector 57 and outputs the received data to the monitor 40 through the PCI bus 36 and interface 37 of the personal computer 1 in which the image processing board 45 is incorporated. The bridge 59 also receives image and sound digital data in MPEG format from the MPEG encoder 58 and outputs the received data to the HDD 41 or the CPU 31 via the PCI bus 36 of the personal computer 1 incorporating the image processing board 45. Furthermore, the bridge 59 receives image and sound digital data in MPEG format from the HDD 41 of the personal computer 1 and outputs the received data to the MPEG decoder 60.

The MPEG decoder 60 decompresses MPEG-format image and sound digital data from the bridge 59 and outputs the decompressed data to the digital selector 57.

The D/A conversion circuit 61 converts image and sound digital data from the digital selector 57 to analog format and outputs the resulting analog signals to the analog selector 55.

The processes executed by the MPEG encoder 58 and MPEG decoder 60 may alternatively be implemented by the CPU 31 using suitable programs.

Figure 4:
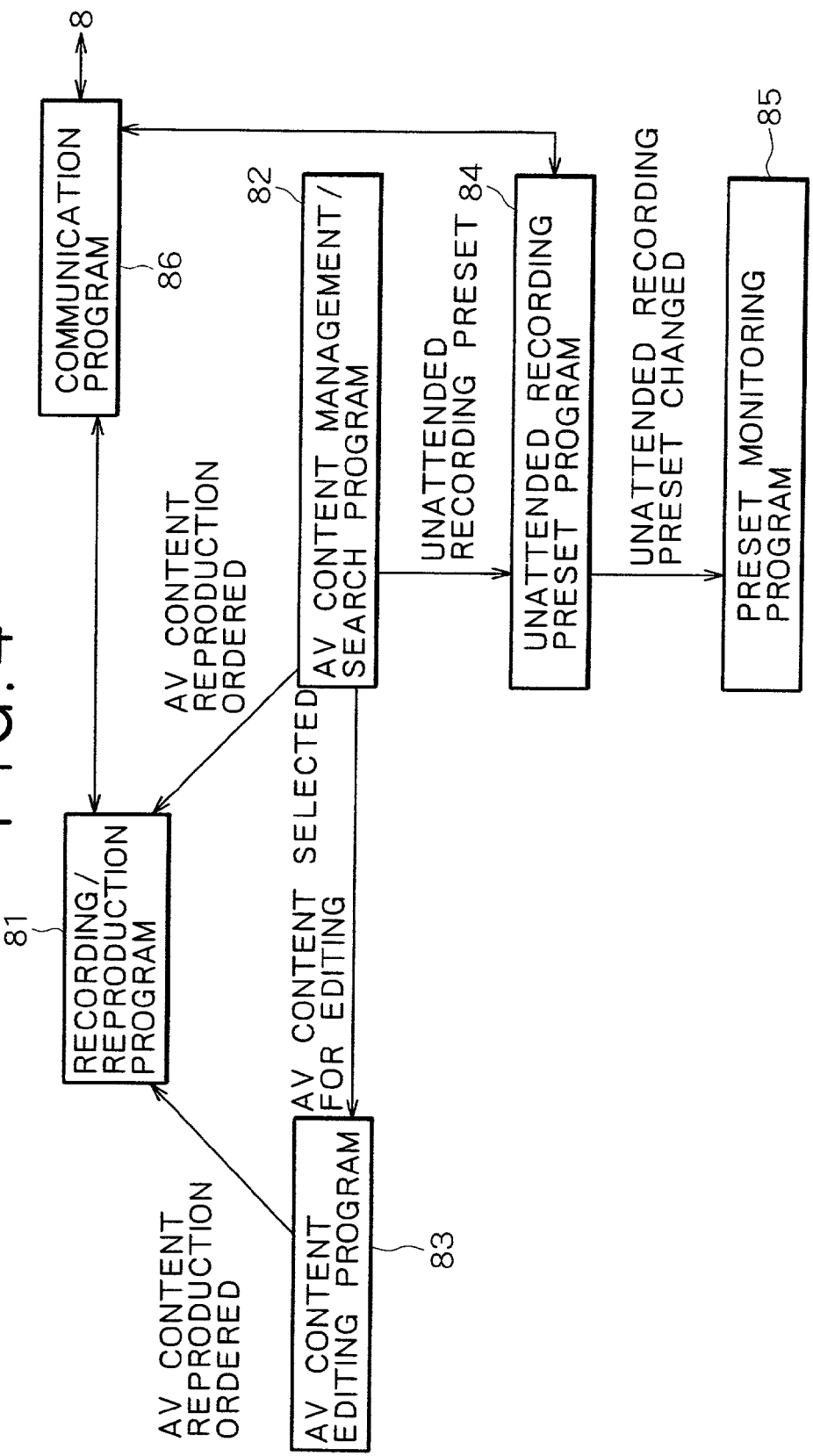
FIG. 4 is a schematic flow diagram showing how application programs are typically performed by the personal computer.

FIG. 4 is a schematic flow diagram showing how application programs are typically performed by the personal computer 1. In FIG. 4, a recording/reproduction program 81 causes the image processing board 45 to select image and sound analog signals of specific channels received by the tuner 54, image and sound analog signals from the VCR 7, or image and sound digital data from the set-top box 5 and to convert the selected analog signals or digital data into image and sound digital data in MPEG format. The converted MPEG-format image and sound digital data are recorded by the image processing board 45 under control of the program 81 to the HDD 41 as an AV (Audio Visual) content made up of at least one file in a predetermined format.

The recording/reproduction program 81 causes the image processing board 45 to decompress an AV content of at least one file in a predetermined format on the HDD 41 so as to generate uncompressed image and sound digital data. Under control of the recording/reproduction program 81, the image processing board 45 causes the monitor 40 to display images and the speakers to output sounds as per the decompressed digital data.

The recording/reproduction program 81 causes the image processing board 45 to select image and sound analog signals of specific channels received by the tuner 54, image and sound analog signals from the VCR 7, image and sound analog signals derived from the image and sound digital data from the set-top box 5, or image and sound analog signals taken from AV contents held on the HDD 41. Under control of the recording/reproduction program 81, the image processing board 45 outputs the selected image and sound analog signals to the monitor 2.

Furthermore, the recording/reproduction program 81 supplies the light-emitting unit 4 with signals for generating light patterns denoting commands for controlling the set-top box 5 or VCR 7.

An AV content management/search program 82 permits display of specific information such as details of TV contents held on the HDD 41 as well as dates and times at which such recordings were made. The AV content management/search program 82 instructs the recording/reproduction program 81 to reproduce a specific AV content or to select an AV content to be edited. The program 82 supplies information on the selected AV content to an AV content editing program 83 for editing purposes. The AV content management/search program 83 further gives an unattended recording instruction to an unattended recording preset program 84.

Based on the AV contents recorded on the HDD 41, the AV content editing program 83 edits images and sounds of selected AV content files (i.e., selected images and sounds are put together) to generate an AV content in a predetermined format for the reproduction of edited images and sounds.

Given suitable settings, the unattended recording preset program 84 presets an AV content to be recorded unattended. The preset AV content complies with the current settings in place (such as recording time and recording mode determining the image quality of recording) and is assigned a storage space beforehand on the HDD 41.

A preset monitoring program 85 runs constantly when the personal computer 1 is in operation (i.e., the program 85 resides on the PC 1 while the OS is running). As such, the preset monitoring program 85 executes unattended recording of the AV content preset by the unattended recording preset program 84 in keeping with an RTC (Real Time Clock), not shown. The preset monitoring program 85 also permits modifications of AV content settings for unattended recording.

Under control of the recording/reproduction program 81, the preset monitoring program 85 supplies the light-emitting unit 4 with signals for generating light patterns denoting commands for controlling the set-top box 5 or VCR 7.

A communication program 86 causes the communication unit 46 to transmit a request for desired data to the server 9 over the network 8, and receives illustratively a TVCI file (to be described later) that is sent from the server 9. The communication program 86 feeds the received TVCI file to the recording/reproduction program 81 and to the unattended recording preset program 84.

When supplied with the TVCI file from the communication program 86, the recording/reproduction program 81 records the supplied file to the HDD 41. At the same time, in accordance with the TVCI file, the recording/reproduction program 81 updates internal data held within the program 81. The internal data are used by the recording/reproduction program 81 illustratively to display channels during a channel selection process.

When fed with a TVCI file from the communication program 86, the unattended recording preset program 84 updates internal data held in the program 84 in keeping with the received file. The internal data are used by the unattended recording preset program 84 illustratively to display channels during an unattended recording preset process.

Figure 5:
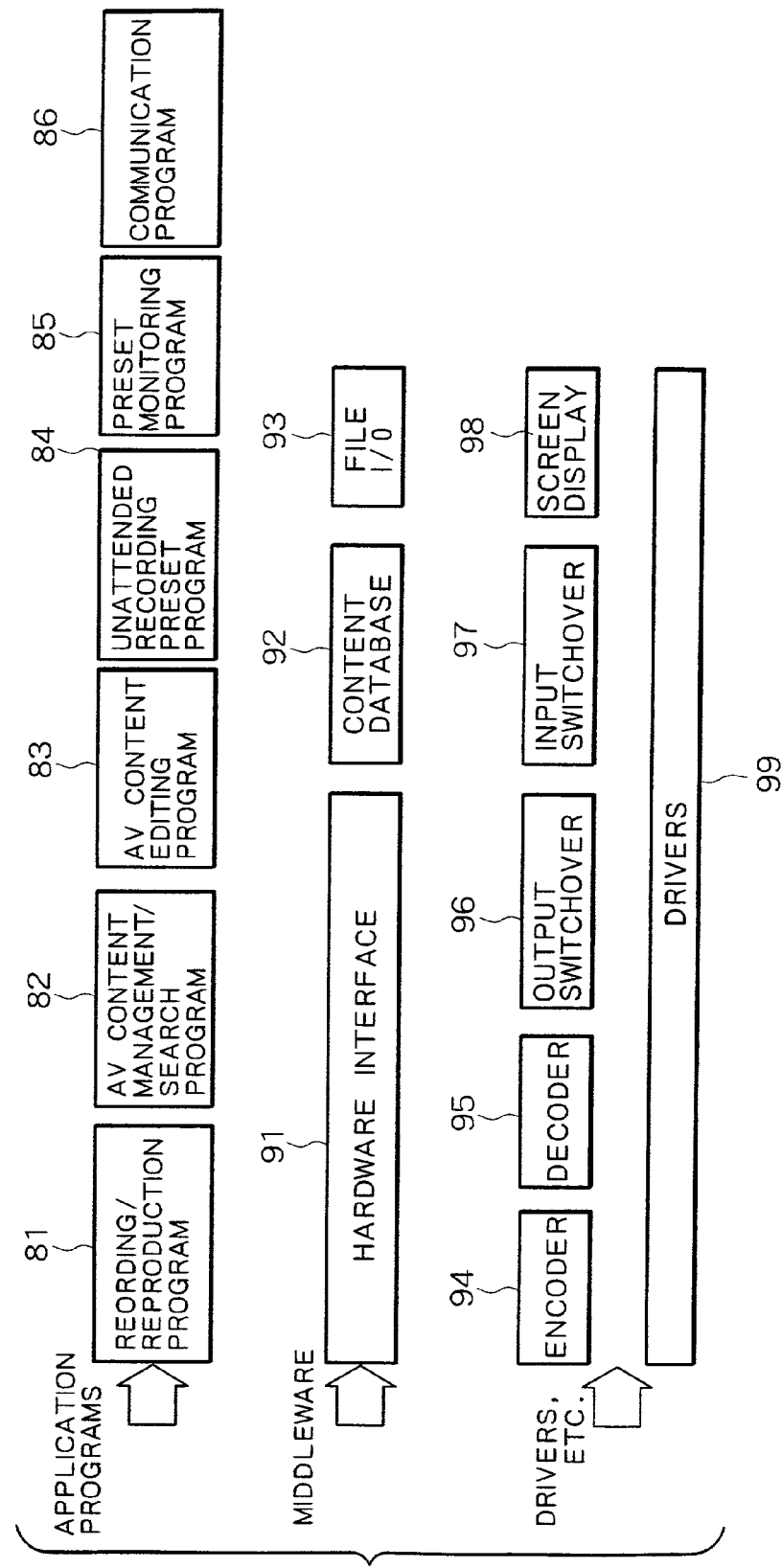
FIG. 5 is an explanatory view depicting a typical structure of application programs, middleware, drivers, etc., executed by the personal computer.

FIG. 5 is an explanatory view depicting a typical structure of application programs, middleware, drivers, etc., executed by the personal computer 1. The middleware causes the suitable drivers and related program elements to run in response to requests from the application programs. The drivers and others actually cause hardware resources such as the MPEG encoder 58 of the image processing board 45 to operate.

A hardware interface 91 arbitrates the uses of hardware resources requested by the recording/reproduction program 81, AV content management/search program 82, AV content editing program 83, unattended recording preset program 84, preset monitoring program 85, or communication program 86. Based on suitable settings including various priorities, the hardware interface 91 allocates available hardware resources to each of the requesting application programs.

A content database 92 stores attribute data (to be described later) and other related data on AV contents. In operation, the content database 92 furnishes the recording/reproduction program 81, AV content management/search program 82, AV content editing program 83, unattended recording preset program 84, or preset monitoring program 85 either with AV content attribute data or with data specifying a file that contains image and sound digital data representing a desired AV content.

A file I/O (input/output) 93 is a package of program elements allowing the recording/reproduction program 81, AV content management/search program 82, AV content editing program 83, unattended recording preset program 84, or preset monitoring program 85 to write and read data upon request to and from a specific AV content (made up of at least one file) by way of the content database 92.

An encoder 94 is a package of program elements allowing the MPEG encoder 58 of the image processing board 45 to compress input image and sound data from the digital selector 57 into MPEG-format digital data.

A decoder 95 is a package of program elements allowing the MPEG decoder 60 of the image processing board 45 to decompress input MPEG-format image and sound digital data from the bridge 59.

An output switchover 96 is a package of program elements causing the analog selector 55 and 1394 interface 51 of the image processing board 45 to operate, thus controlling the output of analog signals and digital data from the image processing board 45.

An input switchover 97 is a package of program elements causing the analog selector 55, 1394 interface 51, DV data interface 52, and digital selector 57 of the image processing board 45 to operate for the selection of analog signals and digital data input to the image processing board 45.

A screen display 98 is a package of program elements causing the digital selector 57 and bridge 59 to operate for the control of image display on the monitor 40.

Drivers 99 are programs that actually operate the image processing board 45 in response to requests from the encoder 94, decoder 95, output switchover 96, input switchover 97, and screen display 98.

In this specification, descriptions about the processing of sounds are omitted hereunder because of its generic nature.

Figure 6:
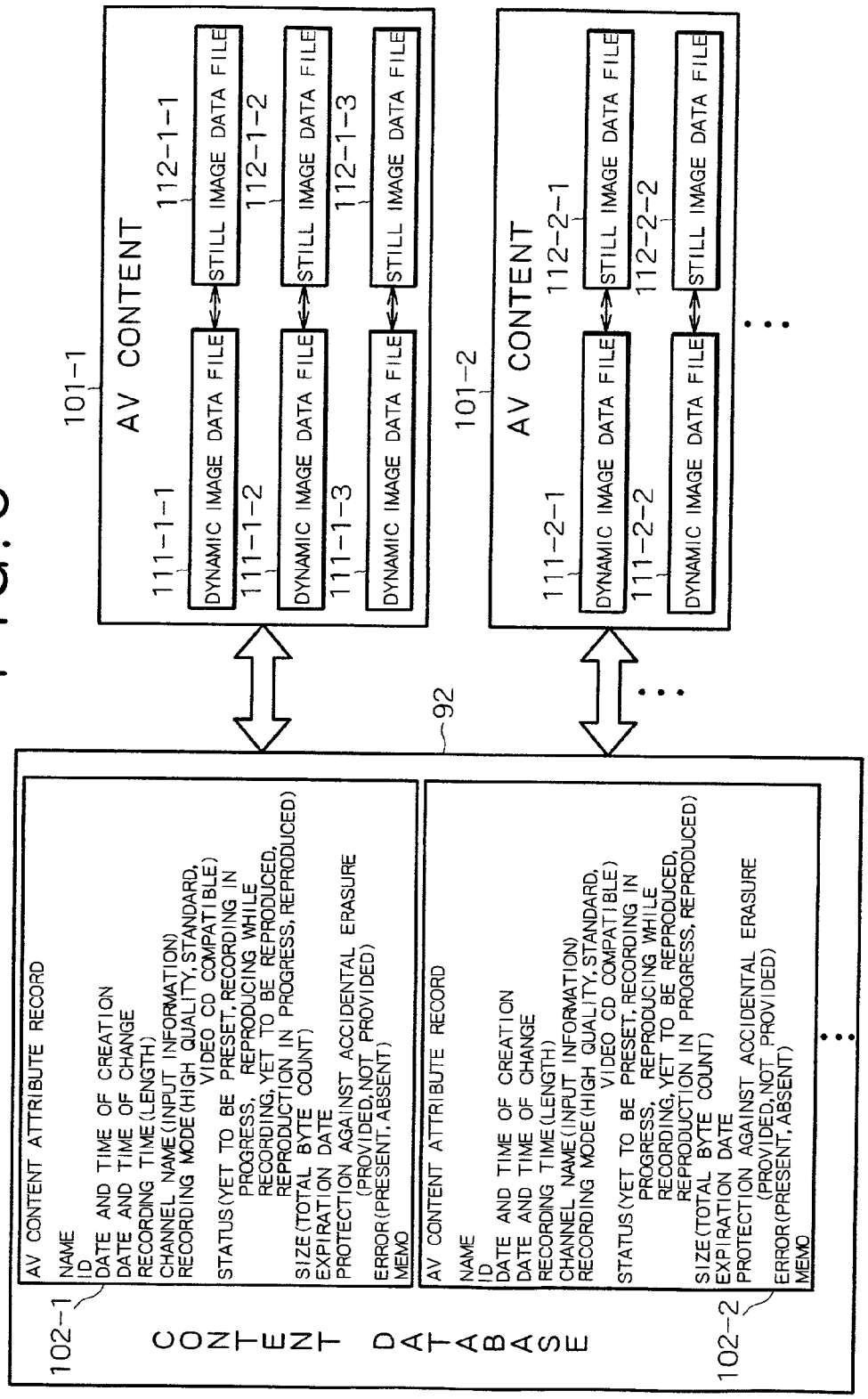
FIG. 6 is an explanatory view indicating a typical structure of AV contents.

FIG. 6 is an explanatory view indicating a typical structure of AV contents. AV content attributes are stored in the content database 92 held on the HDD H41. An AV content attribute record 102-1 in the content database 92 accommodates the following attribute data about an AV content 101-1: name, ID (identification data), date and time of creation, date and time of change, recording time, channel name, recording mode, status, expiration date (with time), protection against accidental erasure, presence or absence of error, two-dimensional bar code (e.g., Cybercode (registered trademark)), memo, and so on. Likewise, an AV content attribute record 102-2 in the content database 92 holds the following attribute data about an AV content 101-2: name, ID, date and time of creation, date and time of change, recording time, channel name, recording mode, status, expiration date, protection against accidental erasure, presence or absence of error, memo, and so on.

The recording mode data contained in the AV content attribute record 102-1 indicate that dynamic image data files 111-1-1 through 111-1-3 are held in one of three modes: high quality mode, standard mode, and video CD compatible mode (which means that image data are in MPEG1 format).

Similarly, the status data in the AV content attribute record 102-1 indicate that the AV content 101-1 is in one of the following states: yet to be preset, recording in progress, reproducing while recording, yet to be reproduced, reproduction in progress, and reproduced.

Error data indicate an erroneous state of the AV content 101-1. An error is recognized illustratively when recording has been stopped halfway because the personal computer 1 failed during recording; when the reception during recording was so poor that images could not be reproduced from the signals input through the antenna 3; or when part of the dynamic image data file 111-1-1 is missing.

One of two things is allowed: neither an expiration date nor protection against accidental erasure is set, or one of them is set. The two settings are never in effect at the same time.

The recording mode data contained in the AV content attribute record 102-2 indicate that dynamic image data files 111-2-1 through 111-2-2 are held in one of three modes: high quality mode, standard mode, and video CD compatible mode. Similarly, the status data in the AV content attribute record 102-2 indicate that the AV content 101-2 is in one of the following states: yet to be preset, recording in progress, reproducing while recording, yet to be reproduced, reproduction in progress, and reproduced.

The AV content 101-1 is constituted by the dynamic image data files 111-1-1 through 111-1-3 and still image data files 112-1-1 through 112-1-3, all held on the HDD 41. The dynamic image data files 111-1-1 through 111-1-3 contain MPEG-format image data. The image corresponding to the first image data in the dynamic image data file 111-1-2 is continued to the image corresponding to the last image data in the dynamic image data file 111-1-1. Likewise, the image corresponding to the first image data in the dynamic image data file 111-1-3 is continued to the image corresponding to the last image data in the dynamic image data file 111-1-2.

The still image data file 112-1-1 contains static image data obtained through conversion of scene switchover images from the image data in the dynamic image data file 111-1-1, along with the corresponding scene switchover times (or the corresponding offset locations in the dynamic image data file 111-1-1). The still image data file 112-1-2 includes static image data obtained through conversion of scene switchover images from the image data in the dynamic image data file 111-1-2, together with the corresponding scene switchover times (or the corresponding offset locations in the dynamic image data file 111-1-2). The still image data file 112-1-3 contains static image data obtained through conversion of scene switchover images from the image data in the dynamic image data file 111-1-3, as well as the corresponding scene switchover times (or the corresponding offset locations in the dynamic image data file 111-1-3).

The AV content 101-2 is constituted by the dynamic image data files 111-2-1 and 111-2-2, as well as by static image data files 112-2-1 and 112-2-2. The specifics of the AV content 101-2 are the same as those of the AV content 101-1 and thus will not be described further.

In the description that follows, the AV contents 101-1 and 101-2 will be simply called the AV content 101 if there is no need to make distinction therebetween. Similarly, under the same circumstances, the AV content attribute records 102-1 and 102-2 will be simply called the AV content attribute record 102; the dynamic image data files 111-1-1 through 111-1-3 as well as 111-2-1 and 111-2-2 will be simply called the dynamic image data file 111; and the static image data files 112-1-1 through 112-1-3 as well as 112-2-1 and 112-2-2 will be simply called the static image data file 112.

Figure 7:
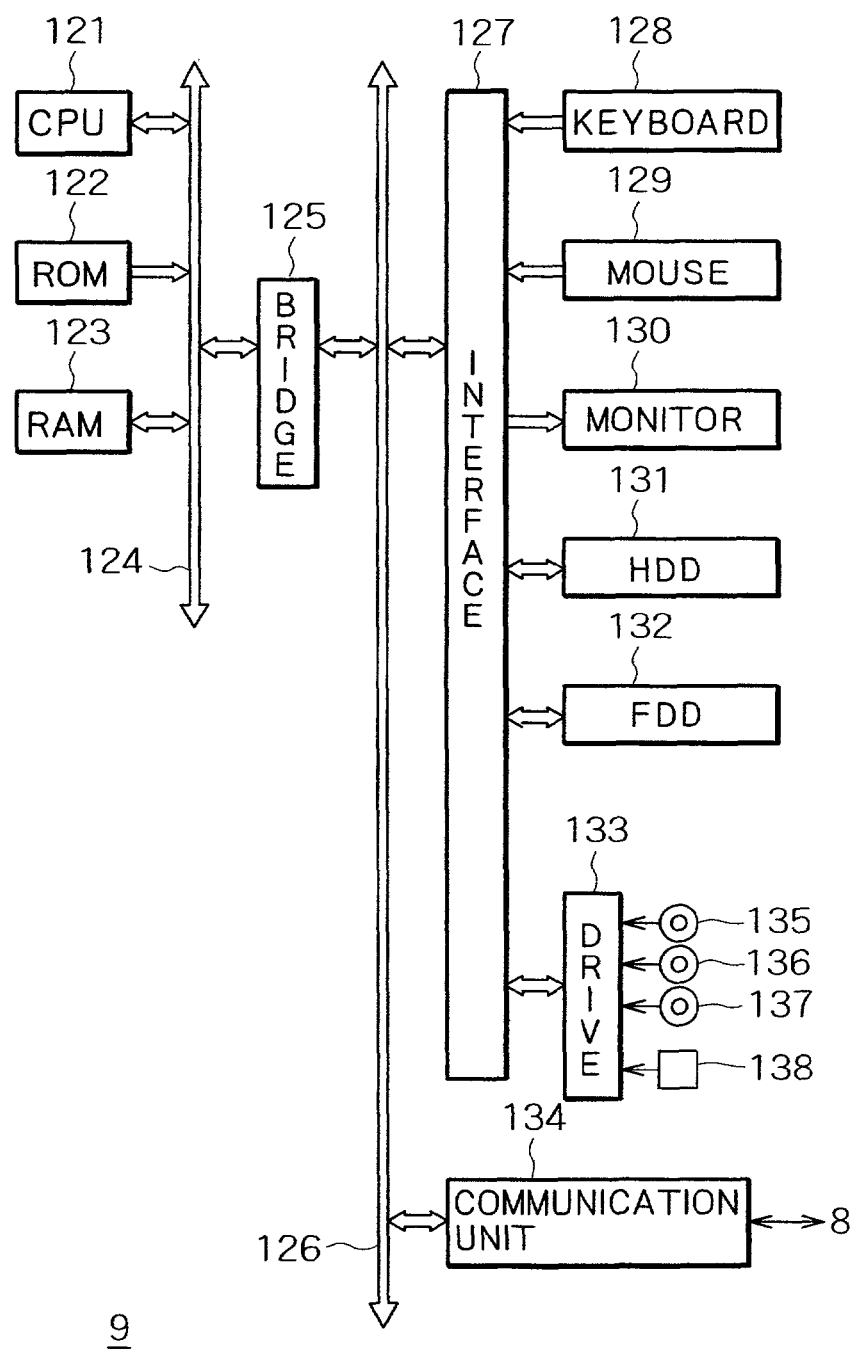
FIG. 7 is a block diagram of a server in the system of FIG. 1.

FIG. 7 is a block diagram showing a typical structure of the server 9. In the server 9, a CPU 121 executes an operating system (OS) and application programs such as a server program. A ROM 122 accommodates basically fixed data as part of the programs and operation parameters used by the CPU 121. A RAM 123 stores programs executed by the CPU 121 and parameters that are varied as needed during the execution. These component parts are interconnected by a host bus 124 composed of a CPU bus or a memory bus.

The host bus 124 is connected via a bridge 125 to an external bus 126 such as a PCI bus.

A keyboard 128 is operated by a user to enter various commands into the CPU 121. A mouse 129 is manipulated by the user to point to and select items on a monitor 130. The monitor 130 is constituted by a CRT (Cathode Ray Tube) or an LCD (Liquid Crystal Display) displaying diverse kinds of information in text and image. An HDD (Hard Disc Drive) 131 and an FDD (Floppy (registered trademark) Disc Drive) 132 drive a hard disc and a floppy disc respectively so that programs and information to be handled by the CPU 121 may be recorded or reproduced to or from the disc in question.

A drive 133 reads programs or data from a magnetic disc 135, an optical disc 136, a magneto-optical disc 137, or a semiconductor memory 138 loaded in the drive. The retrieved programs or data are installed into the personal computer 1 or supplied to the CPU 121 or RAM 123.

The components ranging from the keyboard 128 to the drive 133 are connected to an interface 127. In turn, the interface 127 is connected to the CPU 121 via the external bus 126, bridge 125, and host bus 124.

A communication unit 134 receives data related to the TV stations 13-1 through 13-4 from the servers 21-1 through 21-4 over the network 8, as well as a TVCI file request from the personal computer 1. The communication unit 134 supplies the receive data either to the HDD 131 via the external bus 126 and interface 127 or to the CPU 121 through the external bus 126, bridge 125, and host bus 124.

In response to a TVCI file request sent from the personal computer 1 over the network 8, the communication unit 134 transmits to the personal computer 1 a TVCI file stored illustratively on the HDD 131.

The communication unit 134 is connected to the CPU 121 through the external bus 126, bridge 125, and host bus 124.

The server 21 has the same structure as the server 9 and thus will not be discussed further.

Figure 8:
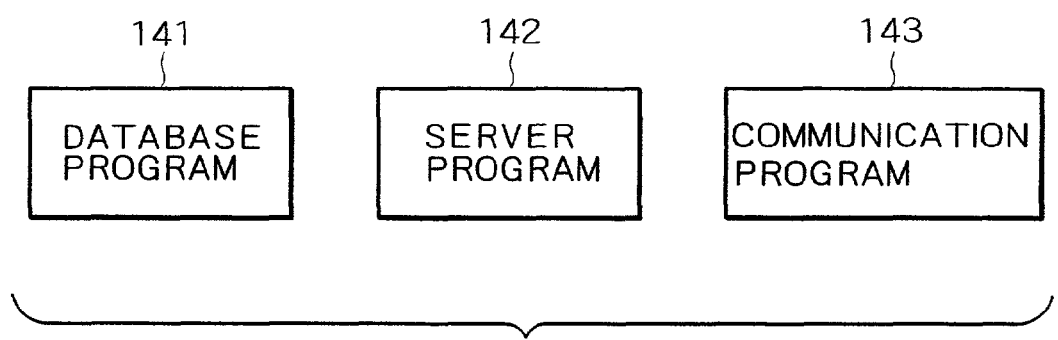
FIG. 8 is an explanatory view showing application programs carried out by the server.

FIG. 8 is an explanatory view showing application programs carried out by the server 9. A database program 141 accommodates data such as TVCI files, to be described later, which are supplied to the personal computer 1 by the server 9. A server program 142 is a program that furnishes the personal computer 1 with data through the network 8, e.g., through a Web server or an FTP (File Transfer Protocol) server. A communication program 143 runs illustratively in keeping with TCP/IP (Transmission Control Protocol/Internet Protocol), receiving requests from the personal computer 1 to the server program 142 over the network 8 and transmitting data to the personal computer 1 under control of the server program 142.

The server 21 performs the same programs as the server 9 described above and thus the workings of these programs will not be discussed further.

Below is a description of how the recording/reproduction program 81 permits display of screens on the monitor 40 of the personal computer 1.

Figure 9:
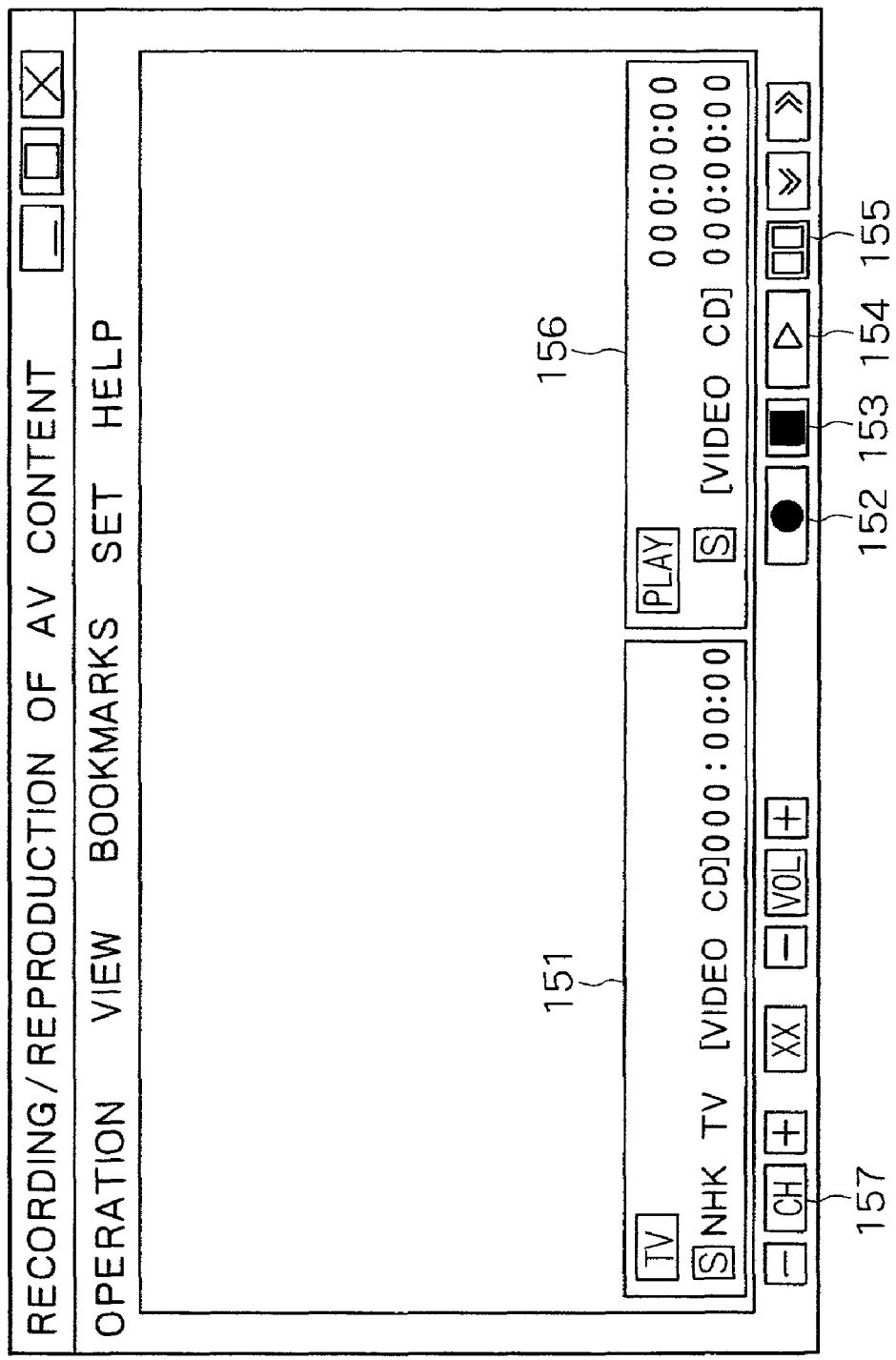
FIG. 9 is an explanatory view of a typical screen displayed by a recording/reproduction program, one of the application programs of the personal computer, on a monitor of the latter.

FIG. 9 is an explanatory view of a typical screen displayed by the recording/reproduction program 81 on the monitor 40 of the personal computer 1.

A recording window 151 is a window in which to set, among others, a channel to be recorded and a recording mode to be put into effect. When recording is started, the recording/reproduction program 81 complies with the settings of the recording window 151 in establishing the operation of the tuner 54 or MPEG encoder 58 of the image processing board 45, creating an AV content 101 and an AV content attribute record 102, and writing what has been created to the HDD 41.

When the recording window 151 is selected and made active, a recording button 152 and a stop button 153 are rendered active and operable. That is, with the recording window 151 selected to be active, the recording/reproduction program 81 starts recording when the recording button 152 is clicked on and stops the recording when the stop button 153 is clicked on.

On the other hand, with the recording window 151 selected to be active, a play button 154 and a pause button 155 are both rendered inactive. That is, the recording/reproduction program 81 does nothing even if the play button 154 or pause button 155 is clicked on.

A reproduction window 156 displays information including the recording mode of the AV content to be reproduced. When the reproduction window 156 is selected and made active, the stop button 153, play button 154, and pause button 155 are rendered active and operable. That is, with the reproduction window 156 selected to be active, the recording/reproduction program 81 starts reproduction when the play button 154 is clicked on, halts temporarily the reproduction when the pause button 155 is clicked on, and stops the reproduction when the stop button 153 is clicked on.

On the other hand, with the reproduction window 156 selected to be active, the recording button 152 is rendered inactive. That is, the recording/reproduction program 81 does nothing even if the recording button 152 is clicked on.

A channel selection button 157 is operated to display a menu in which to select channels, input signals, or input data.

Figure 10:
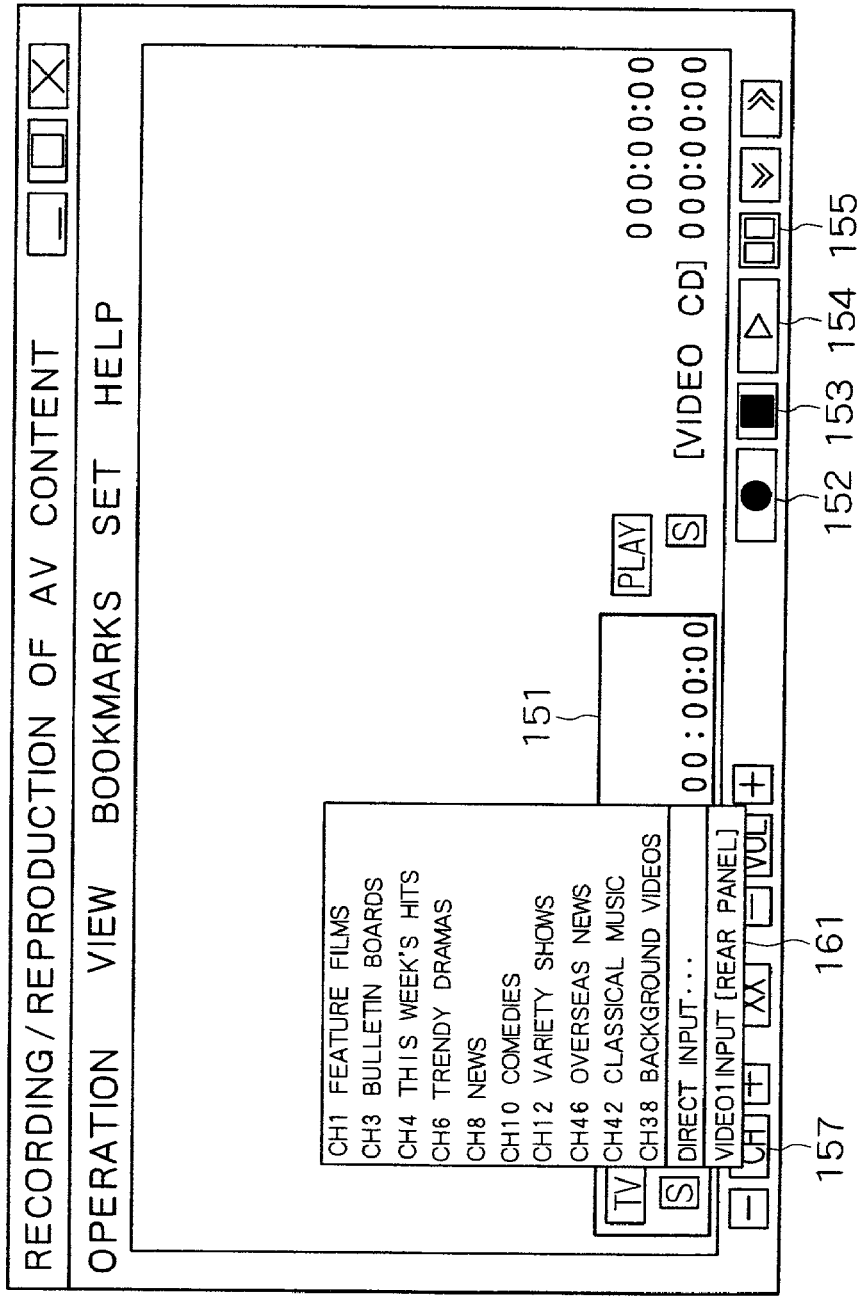
FIG. 10 is an explanatory view of another typical screen displayed by the recording/reproduction program on the monitor.

Clicking on the channel selection button 157 causes the recording/reproduction program 81 to display a channel selection menu 161 on the monitor 40 of the personal computer 1, as shown in FIG. 10.

When a channel, an input signal, or input data are selected in the channel selection menu 161, the recording/reproduction program 81 establishes the channel, input signal, or input data regarding the TV program to be displayed on the monitors 2 and 40 or regarding the TV program to be recorded, in compliance with the selection settings in the channel selection menu 161.

The recording/reproduction program 81 generates internal data based on a TVCI file stored beforehand on the HDD 41 or received from the server 9. The internal data are data for use in displaying the channel selection menu 161.

The TVCI file will now be described. FIG. 11 is an explanatory view showing a typical structure of the TVCI file.

The top line in the TVCI file is constituted by a character string "Content-type:application/x-tv-channel-info" indicating that this is a TVCI file.

On the second line of the TVCI file comes a character string "version:2" indicating the current version number of this file.

The third line of the TVCI file contains a zip code representing the territory to which this TVCI file is applicable. The actual zip code comes after a character string "zipcode:" on this line.

The fourth line of the TVCI file accommodates the name of a TV program provider 10-1 or 10-2 to which this TVCI file applies. The actual TV provider name comes after a character string "providers:" on this line.

The fifth line of the TVCI file is made of data indicating the type of TV program distribution effected by the TV program provider 10-1 or 10-2 specified by the name on the preceding line. The data representative of the type of TV program distribution in force designate one of three types: cable (CATV, or Cable Television System) indicated by a character string "cable"; broadcast via satellite 11 denoted by a character string "satellite"; and broadcast via ground waves represented by a character string "antenna". The actual data denoting the type comes after a character string "broadcast-type:" on this line.

On each of the sixth and subsequent lines of the TVCI file come data about the channel of a TV program distributed by a TV program provider 10-1 or 10-2 specified by a provider name. The actual channel data are located after a character string "station-desc:" on the line in question.

The channel of the TV program distributed by the TV program provider 10-1 or 10-2 corresponds to one of the TV stations 13-1 through 13-4.

The channel data in the TVCI file are composed of the channel number as well as the name, favorite flag, and genre regarding each of the TV stations 13-1 through 13-4 involved.

The favorite flag is a flag that determines whether or not the data about the corresponding channel are to be displayed in the channel selection menu 161, as will be described later in detail.

The genre indicates categories of TV programs such as sports, news, and dramas.

FIG. 12 is a schematic view indicating another TVCI file as an example. FIG. 12 shows a number 95050 after the character string "zipcode:" on the third line of the file. That means the zip code 95050 represents the territory to which the TVCI file of FIG. 12 is applicable.

A character string "BU&U CABLE SERVICES, SANTA CLARA" appears following the character string "providers:" on the fourth line of the TVCI file in FIG. 12. That means the name of the TV program provider to which the TVCI file of FIG. 12 applies is BU&U CABLE SERVICES, SANTA CLARA.

A character string "cable" appears after the character string "broadcast-type:" on the fifth line of the TVCI file in FIG. 12. That means the TV program provider to which this file applies distributes TV programs over the cable (CATV).

The character string "station-desc:" in the TVCI file of FIG. 12 is followed by data about channels 1, 3, 4, 6, 8, 10, 12, 46, 42, and 38.

In the TVCI file of FIG. 12, the TV station on channel 1 is named "FEATURE FILMS." The favorite flag for channel 1 is set to 1.

In the file of FIG. 12, the TV station on channel 3 is named "BULLETIN BOARDS." The favorite flag for channel 3 is set to 1.

In the same file, the TV station on channel 4 is named "THIS WEEK'S HITS." The favorite flag for channel 4 is set to 1.

Likewise, the TV station on channel 6 is named "TRENDY DRAMAS" in the file. The favorite flag for channel 6 is set to 1.

The TV station on channel 8 is named "NEWS" in the file. The favorite flag for channel 8 is set to 1.

The TV station on channel 10 is named "COMEDIES" in the file. The favorite flag for channel 10 is set to 1.

The TV station on channel 12 is named "VARIETY SHOWS" in the file. The favorite flag for channel 12 is set to 1.

The TV station on channel 46 is named "OVERSEAS NEWS" in the file. The favorite flag for channel 46 is set to 1.

The TV station on channel 42 is named "CLASSICAL MUSIC" in the file. The favorite flag for channel 42 is set to 1.

The TV station on channel 38 is named "BACKGROUND VIDEOS" in the file. The favorite flag for channel 38 is set to 1.

FIG. 13 is an explanatory view of another typical screen showing a channel selection menu 161 based on the TVCI file of FIG. 12. The channel selection menu 161 in FIG. 13 shows channel 1 together with the TV station name "FEATURE FILMS," channel 3 having the name "BULLETIN BOARDS," channel 4 named "THIS WEEK'S HITS," channel 6 named "TRENDY DRAMAS," channel 8 named "NEWS," channel 10 named "COMEDIES," channel 12 named "VARIETY SHOWS," channel 46 named "OVERSEAS NEWS," channel 42 named "CLASSICAL MUSIC," and channel 38 named "BACKGROUND VIDEOS."

FIG. 14 is a schematic view of a TVCI file that is sent by the server 9 over the network 8 and received by the personal computer 1. In FIG. 14, the character string "station-desc:" is followed by data about channels 1, 3, 4, 6, 8, 10, 12, 46, 42, and 38, plus channel 7.

In the TVCI file of FIG. 14, channel 7 corresponds to a TV station named "MIDSUMMER NIGHT'S GHOST STORIES (NEW!)." The favorite flag for channel 7 is set to 1.

On receiving the TVCI file, the personal computer 1 updates its internal data for use in displaying the channel selection menu 161.

FIG. 15 is an explanatory view of an updated channel selection menu 161 displayed by the personal computer 1 when the personal computer 1, after displaying the channel selection menu 161 based on the TVCI file of FIG. 12, has updated its internal data upon receipt of the TVCI file of FIG. 14.

When the personal computer 1 has updated its internal data based on the TVCI file of FIG. 14, the personal computer 1 causes the channel selection menu 161 to indicate channel 1 together with the TV station name "FEATURE FILMS," channel 3 along with the name "BULLETIN BOARDS," channel 4 having the name "THIS WEEK'S HITS," channel 6 with the name "TRENDY DRAMAS," channel 8 named "NEWS," channel 10 named "COMEDIES," channel 12 named "VARIETY SHOWS," channel 46 named "OVERSEAS NEWS," channel 42 named "CLASSICAL MUSIC," and channel 38 named "BACKGROUND VIDEOS," plus channel 7 having the TV station name "MIDSUMMER NIGHT'S GHOST STORIES (NEW!)."

As described, when receiving the TVCI file from the server 9 over the network 8, the personal computer 1 updates the internal data based on the received file and displays the channel selection menu accordingly allowing the user to select channels. Illustratively, it may happen that TV program providers offer numerous channels and that they alter their channel-to-station assignments every season. In that case, the personal computer 1 may receive the TVCI file reflecting the seasonal channel-to-station assignment changes and easily update the internal data accordingly. This allows the personal computer 1 to receive the TV programs correctly over the changed channels.

How the internal data settings are processed will now be described. When a channel setting command is selected from the menu named "SET" in the window displayed by the recording/reproduction program 81, the recording/reproduction program 81 causes the monitor 40 to display a channel setting window. In the channel setting window, the recording/reproduction program 81 displays items to be in compliance with the settings of the TVCI file and internal data.

FIG. 16 indicates a typical channel setting window in effect when the channel selection menu 161 of FIG. 13 appears. The channel setting window indicates, for each of the channels involved, a channel number to be specified by use of a remote controller (not shown) along with the marking of a favorite channel where applicable and a TV station name.

Where a given channel is set as a favorite (indicated by a check mark), the recording/reproduction program 81 displays the number of the channel in question and the corresponding TV station name in the channel selection menu 161.

It may happen that with the channels checked as favorites, the user unchecks some of their markings. In that case, the recording/reproduction program 81 cancels the favorite setting for each of the unchecked channels and suppresses the display of the numbers and TV station names of the canceled channels.

For example, suppose that in the channel setting window of FIG. 16, channels 3, 6, 10, and 42 in the "Received Channels" column are clicked on. This causes the recording/reproduction program 81 to cancel (i.e., uncheck) the favorite settings for channels 3, 6, 10, and 42, as shown in FIG. 17.

Figure 17:
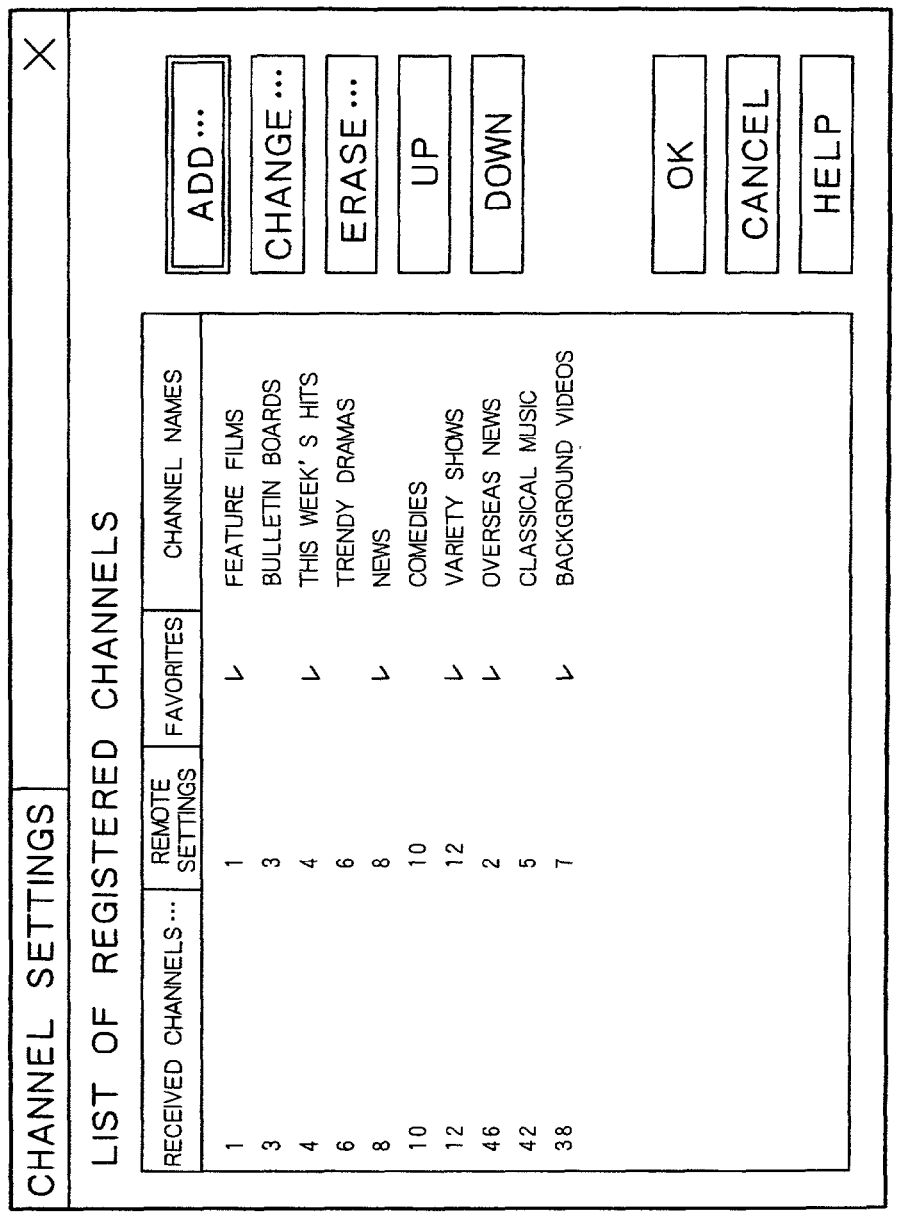
FIG. 17 is a schematic view of another typical window in which to set channels.

After the favorite settings are established as shown in FIG. 17, the user clicks on the OK button. This causes the recording/reproduction program 81 to generate internal data consisting only of the data regarding the TV stations corresponding to the channels set as favorites.

Figure 18:
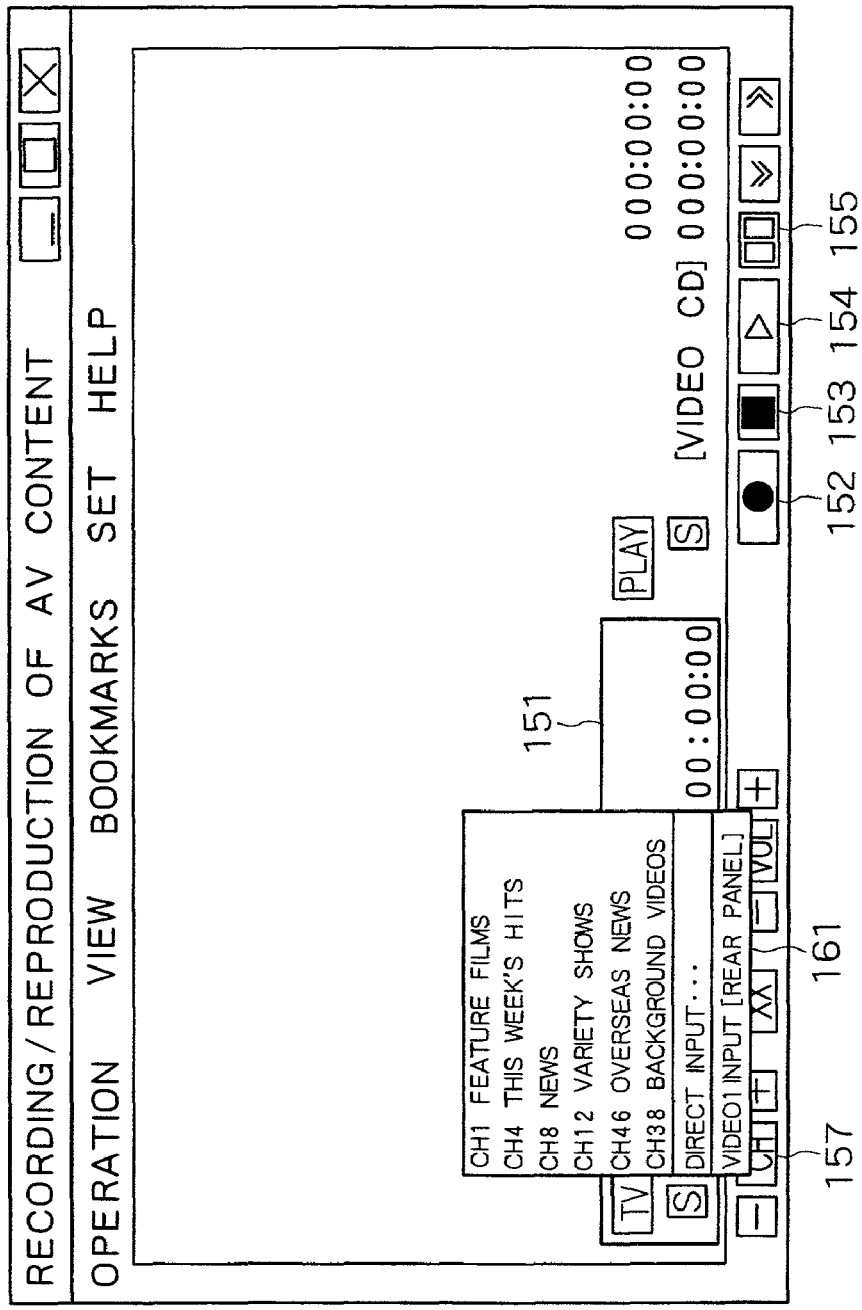
FIG. 18 is an explanatory view of another typical screen displayed by the recording/reproduction program on the monitor.

The internal data thus generated reflect channels 3, 6, 10, and 42 having been deprived of their favorite settings. As a result, the recording/reproduction program 81 displays a command to select any one of channels 1, 4, 8, 12, 46, and 38 in the channel selection menu 161 as shown in FIG. 18; there is no display of a command for selecting channel 3, 6, 10, or 42.

FIG. 19 is a schematic view of another TVCI file sent from the server 9 over the network 8 and received by the personal computer 1. In the example of FIG. 19, the character string "station-desc:" is followed by data about channels 1, 3, 4, 6, 8, 10, 12, 46, 42, and 38 of which the favorite flags are set to 0, plus channel 7 whose favorite flag is set to 1.

In the TVCI file of FIG. 19, channel 7 corresponds to the TV station named "MIDSUMMER NIGHT'S GHOST STORIES (NEW!)."

On receiving the TVCI file, the recording/reproduction program 81 compares the channel data in the received file with those of the TVCI file received previously from the same TV program provider. Through the comparison, the program 81 extracts data about any channel whose number or name is judged different and whose favorite flag is set to 1.

The recording/reproduction program 81 updates the internal data by adding the extracted channel data to the existing internal data.

Figure 20:
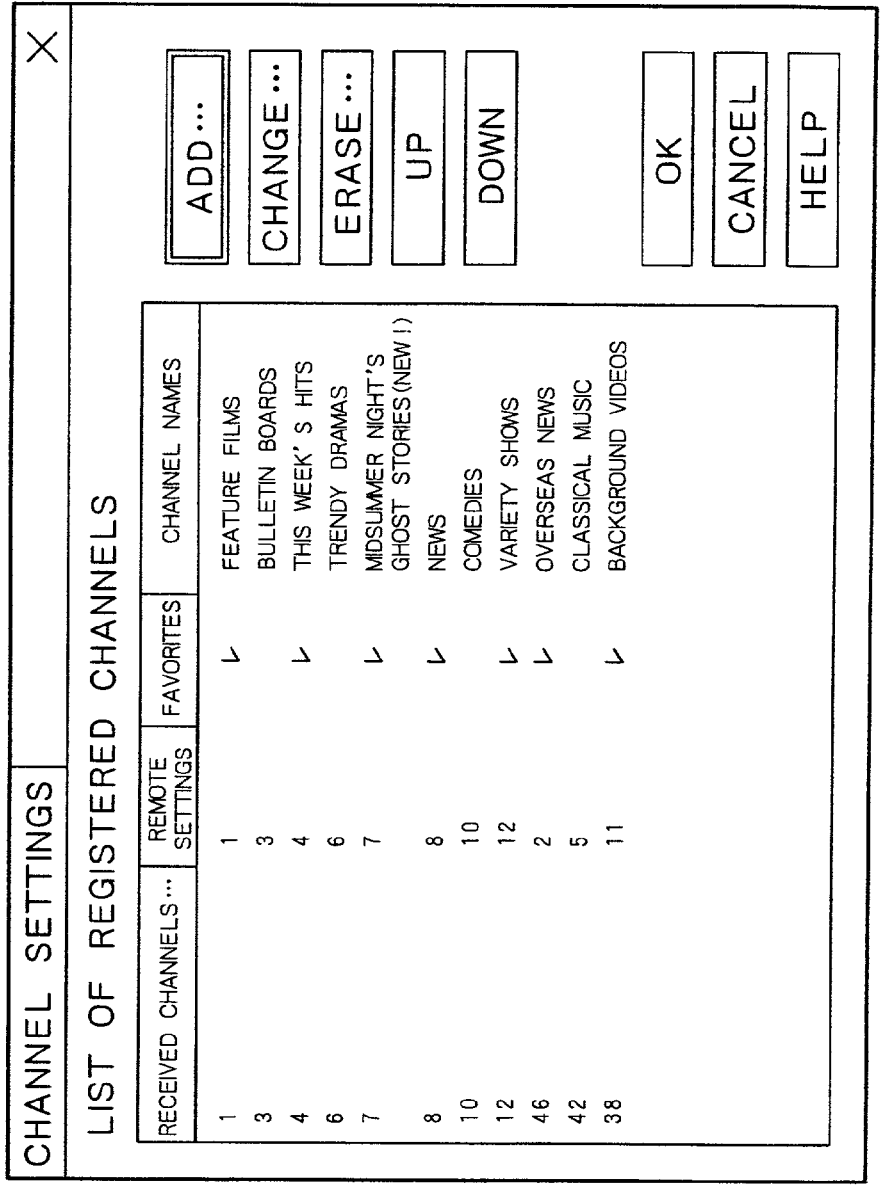
FIG. 20 is a schematic view of another typical window in which to set channels.

Suppose now that the existing internal data correspond to the channel setting window of FIG. 17; that the TVCI file of FIG. 19 has been received so as to update the internal data accordingly; and that a channel setting command is selected from the menu named "SET." In that case, the recording/reproduction program 81 displays a channel setting window shown in FIG. 20.

In FIG. 20, the recording/reproduction program 81 displays in the channel setting window the data about channel 7 whose number or name is judged different and whose favorite flag is set for 1. The display is given on the basis of the internal data acquired by supplementing the existing data with the data about channel 7.

On receiving the TVCI file, the personal computer 1 updates its internal data for use in displaying the channel selection menu 161.

Figure 21:
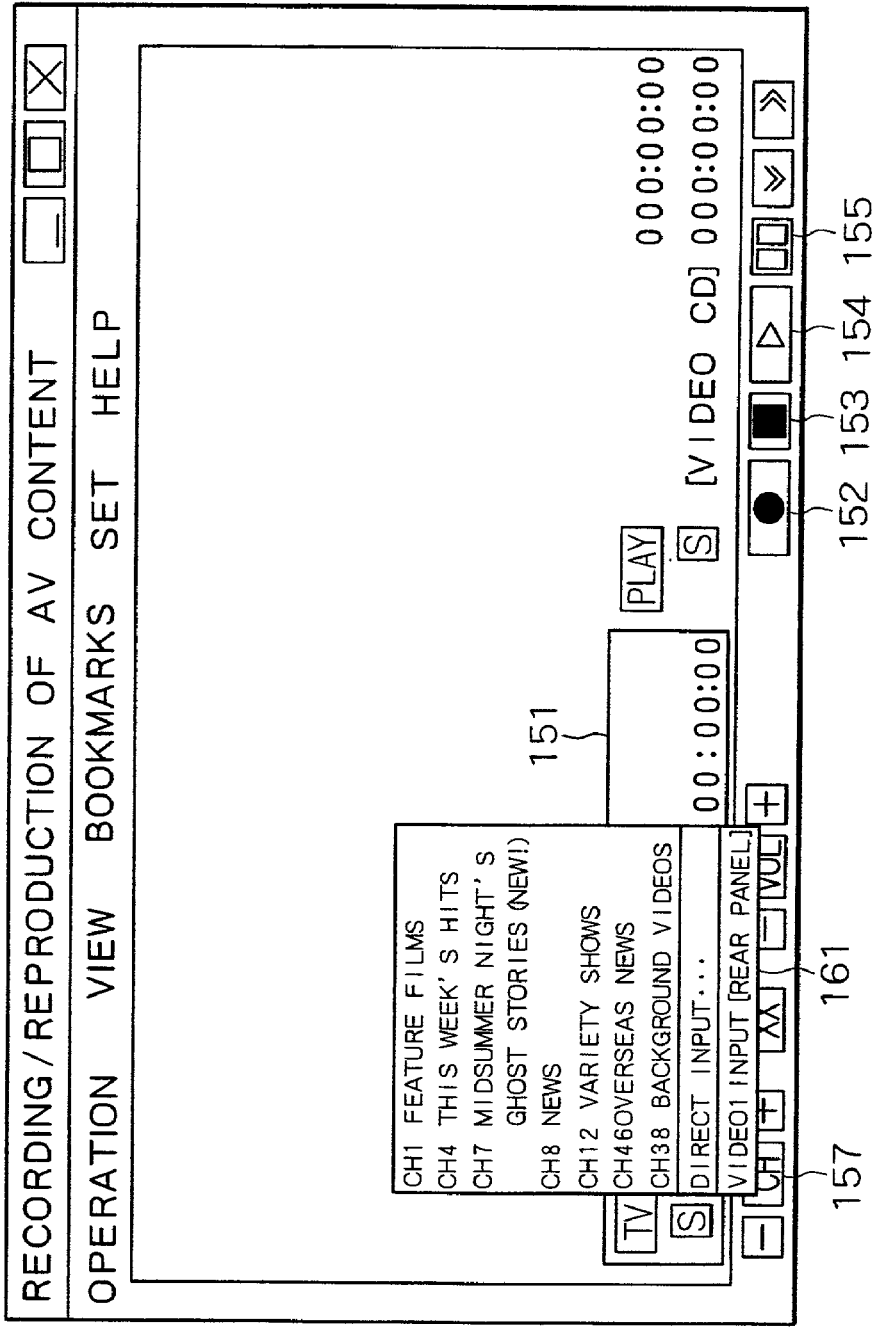
FIG. 21 is an explanatory view of another typical screen displayed by the recording/reproduction program on the monitor.

FIG. 21 is an explanatory view of a channel selection menu 161 that appears when the recording/reproduction program 81, having generated internal data based on the channel setting window of FIG. 17, receives the TVCI file of FIG. 19 and updates the internal data accordingly. The channel selection menu 161 displays a command for selecting channel 7.

Figure 22:
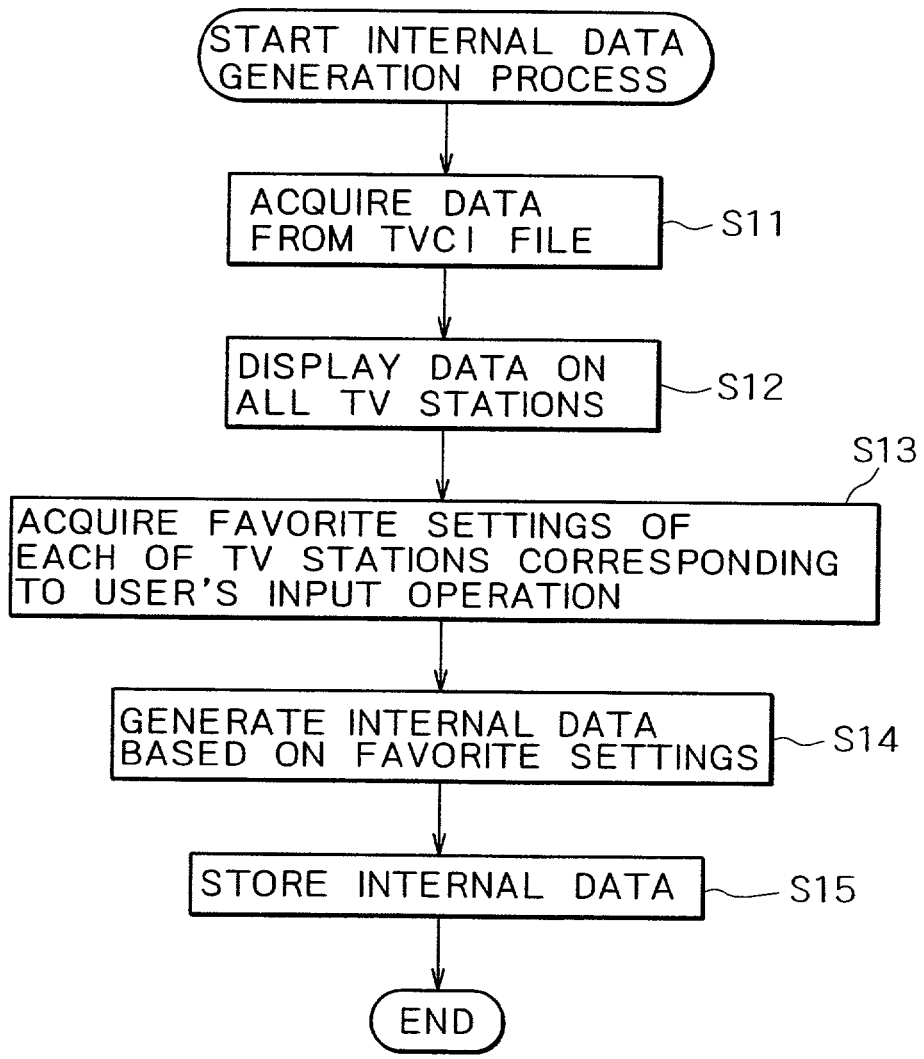
FIG. 22 is a flowchart of steps constituting an internal data generation process.

Described below with reference to the flowchart of FIG. 22 is an internal data generation process carried out by the recording/reproduction program 81 while the channel setting window is being displayed. In step S11, the recording/reproduction program 81 acquires data about each of the channels involved from the TVCI file stored on the HDD 41.

In step S12, the recording/reproduction program 81 displays in the channel setting window all TV station data corresponding to the acquired data.

In step S13, the recording/reproduction program 81 acquires the favorite settings for each of the TV stations corresponding to the user's input operation in the channel setting window.

In step S14, the recording/reproduction program 81 generates internal data based on the favorite settings of the TV stations involved. Illustratively, the recording/reproduction program 81 generates the internal data not by use of the TVCI file data corresponding to each TV station whose favorite setting is cancelled but through the extraction of the TVCI file data corresponding only to the TV stations established as favorites.

In step S15, the recording/reproduction program 81 stores the generated internal data within the program 81 itself, and terminates the internal data generation process.

As described, the recording/reproduction program 81 generates the internal data, i.e., data for selecting channels, on the basis of the TVCI file and the user's settings. The generated internal data are stored within the program 81.

Figure 23:
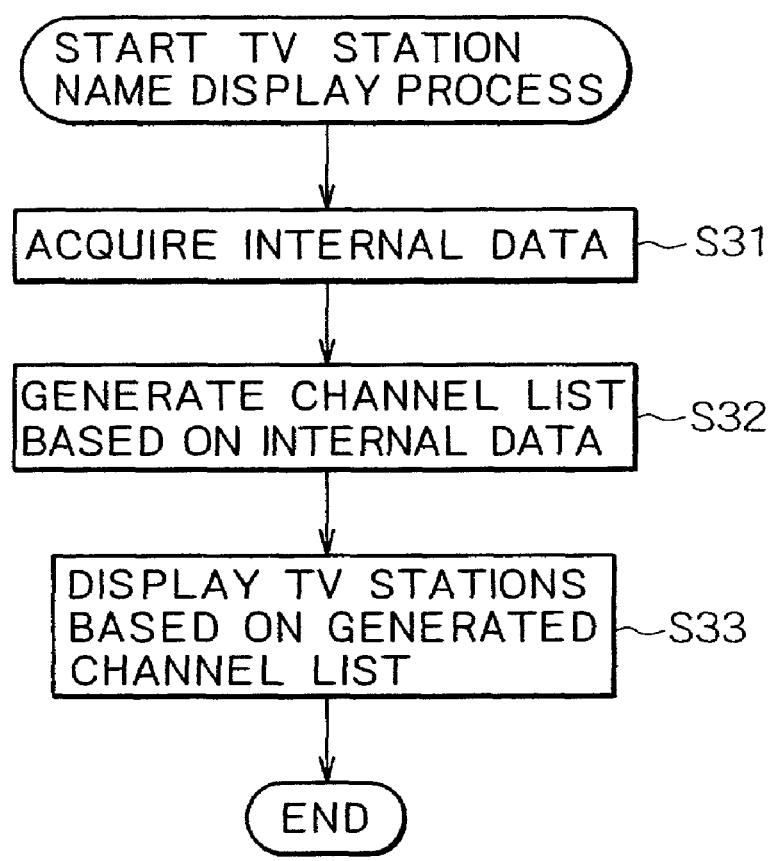
FIG. 23 is a flowchart of steps constituting a TV station name display process.

Described below with reference to the flowchart of FIG. 23 is a typical TV station name display process performed by the recording/reproduction program 81 while the channel selection menu 161 is being displayed. In step S31, the recording/reproduction program 81 acquires the internal data stored within the program 81 itself.

In step S32, the recording/reproduction program 81 generates a channel list based on the acquired internal data. The channel list is a list that associates channel numbers with TV station names.

In step S33, the recording/reproduction program 81 displays the TV station names based on the generated channel list. This terminates the TV station name display process. Illustratively, the recording/reproduction program 81 displays channel numbers in association with TV station names in the channel selection menu 161.

As described, the recording/reproduction program 81 displays the user-selected TV station names on the basis of the internal data generated in accordance with the data in the TVCI file and the user's settings.

Figure 24:
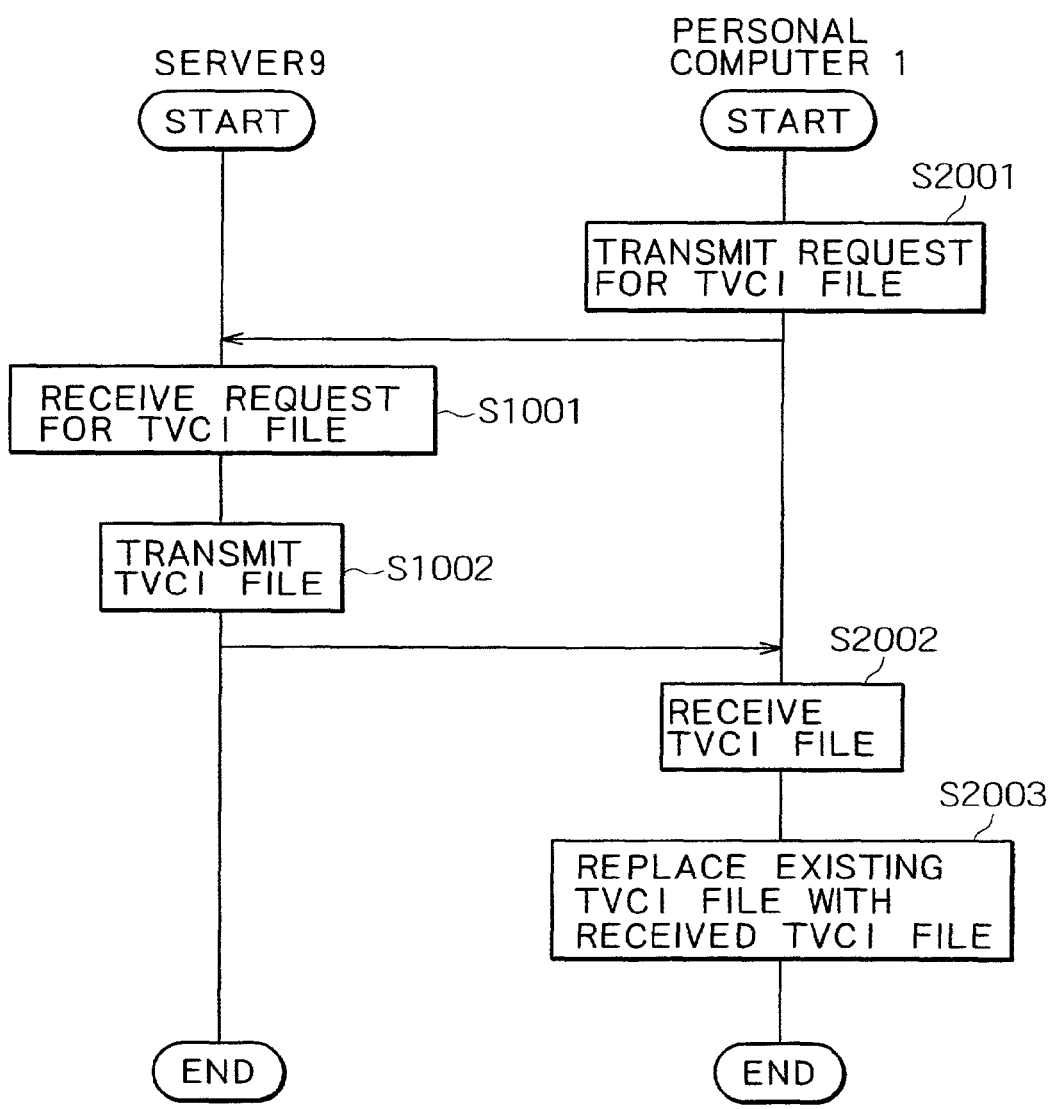
FIG. 24 is a flowchart of steps constituting a TVCI file acquisition process.

How the personal computer 1 acquires a TVCI file will now be described by referring to the flowchart of FIG. 24. In step S2001, the communication program 86 of the personal computer 1 causes the communication unit 46 to transmit a request for the TVCI file to the server 9 over the network 8.

In step S1001, the communication program 143 of the server 9 causes the communication unit 134 to receive the TVCI file request from the personal computer 1. In step S1002, the server program 142 of the server 9 causes the database 141 to retrieve the TVCI file corresponding to the request and prompts the communication unit 134 to transmit the retrieved TVCI file to the personal computer 1 over the network 8.

In step S2002, the communication program 86 of the personal computer 1 causes the communication unit 46 to receive the TVCI file coming from the server 9. The communication program 86 supplies the received TVCI file to the recording/reproduction program 81 and unattended recording preset program 84. In step S2003, the communication program 86 substitutes the received TVCI file for the existing TVCI file held illustratively on the HDD 41. This terminates the TVCI file acquisition process. The communication program 86 records the replaced TVCI file as the previous TVCI file on the HDD 41.

As described, on receiving the TVCI file from the server 9, the personal computer 1 replaces the existing TVCI file with the received file. The personal computer 1 retains the replaced TVCI file as the immediately preceding TVCI file.

Although the TVCI file was described as transmitted and received over the network 8, this is not limitative of the invention. Alternatively, the TVCI file may be offered to the personal computer 1 by use of a suitable storage medium such as the magnetic disc 47, optical disc 48, magneto-optical disc 49, or semiconductor memory 50 shown in FIG. 2.

Figure 25:
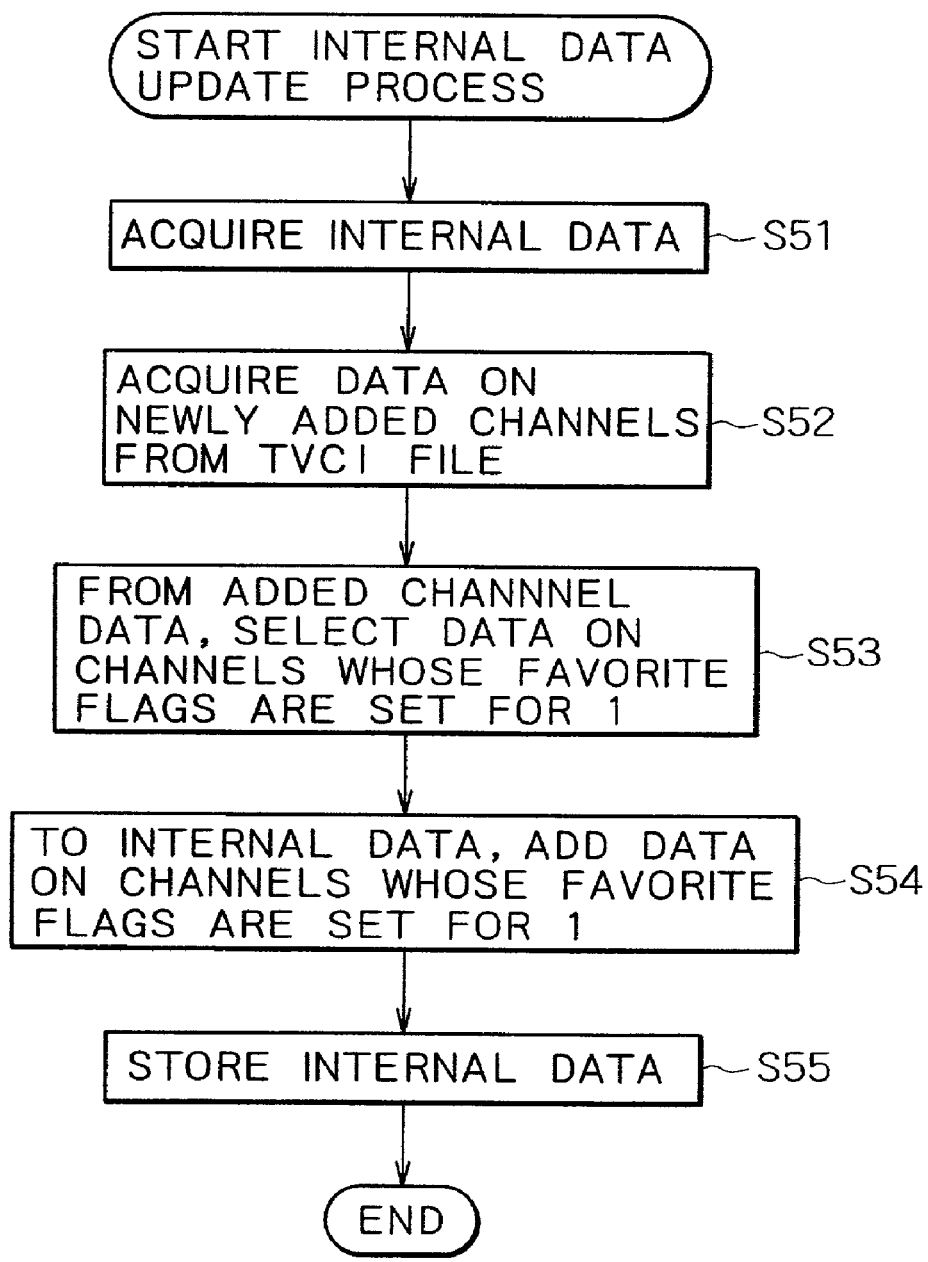
FIG. 25 is a flowchart of steps constituting an internal data update process.

Described below with reference to the flowchart of FIG. 25 is an internal data update process carried out by the recording/reproduction program 81 upon receipt of the TVCI file from the server 9. In step S51, the recording/reproduction program 81 acquires the internal data from within the program 81 itself.

In step S52, the recording/reproduction program 81 compares the immediately preceding TVCI file held on the HDD 41 with the updated TVCI file in order to acquire data about any newly added channels in the updated file.

In step S53, the recording/reproduction program 81 selects the data about each of any newly added channels of which the favorite flag is set to 1. In step S54, the recording/reproduction program 81 adds to the internal data the data about the newly added channels whose favorite flags are set to 1.

In step S55, the recording/reproduction program 81 stores within the program 81 itself the internal data supplemented with the data about the newly added channels whose favorite flags are set to 1. This terminates the internal data update process.

In the manner described, the personal computer 1 may extract from the updated TVCI file the data about the newly added channels whose favorite flags are set to 1, and add the extracted channel data to the internal data in storage.

The process above allows the personal computer 1 quickly to update its internal data by simply receiving the TVCI file reflecting any channel-to-station assignment changes made by TV program providers offering numerous channels. The updates enable the personal computer 1 to receive TV programs correctly over the changed channels.

The personal computer 1 may also control the set-top box 5 by means of the light-emitting unit 4 based on the internal data reflecting the assignment changes. In such a case, if the channel assignments of the TV stations involved are found to have been changed upon receipt by the set-top box 5, the user may get the personal computer 1 to receive the relevant TVCI file in order to have the set-top-box 5 receive the differently assigned TV programs correctly and in timely fashion.

It was stated above that from the updated TVCI file, the data about any newly added channels whose favorite flags are set to 1 are extracted and added to the internal data. Alternatively, the recording/reproduction program 81 may extract from the updated TVCI file the data about newly added channels regardless of their favorite flag settings before adding the extracted data to the internal data. As another alternative, the recording/reproduction program 81 may extract from the updated TVCI file the all data about those channels whose favorite flags are set to 1 and add the extracted channel data to the internal data (i.e., the already stored channel data remain unchanged).

Another typical structure of the TVCI file will now be described. In the TVCI file shown in FIG. 26, channel data are arranged in a favored order. For example, channels may be given favored ranks ranging from 5 to 1 (only in integers). Upon receipt of the TVCI file in FIG. 26, the data about each of the channels involved are given priority higher, the larger the favored rank number for the program in question when added to the internal data by the recording/reproduction program 81.

In the TVCI file shown in FIG. 26, channel 1 has the TV station name "FEATURE FILMS." This channel is given a favored rank of 5.

Channel 3 has the TV station name "BULLETIN BOARDS" in the TVCI file of FIG. 26. This channel is given a favored rank of 2.

Channel 4 has the TV station name "THIS WEEK'S HITS" in the file of FIG. 26. This channel is given a favored rank of 5.

In the same TVCI file, channel 6 has the TV station name "TRENDY DRAMAS." This channel is given a favored rank of 3.

Channel 8 has the TV station name "NEWS" in the same file. This channel is given a favored rank of 4.

Channel 10 has the TV station name "COMEDIES" in the file of FIG. 26. This channel is given a favored rank of 3.

Channel 12 has the TV station name "VARIETY SHOWS" in the same file. This channel is given a favored rank of 4.

Channel 46 has the TV station name "OVERSEAS NEWS" in the same file. This channel is given a favored rank of 4.

Channel 42 has the TV station name "CLASSICAL MUSIC" in the TVCI file of FIG. 26. This channel is given a favored rank of 1.

Channel 38 has the TV station name "BACKGROUND VIDEOS" in the same file. This channel is given a favored rank of 5.

Figure 27:
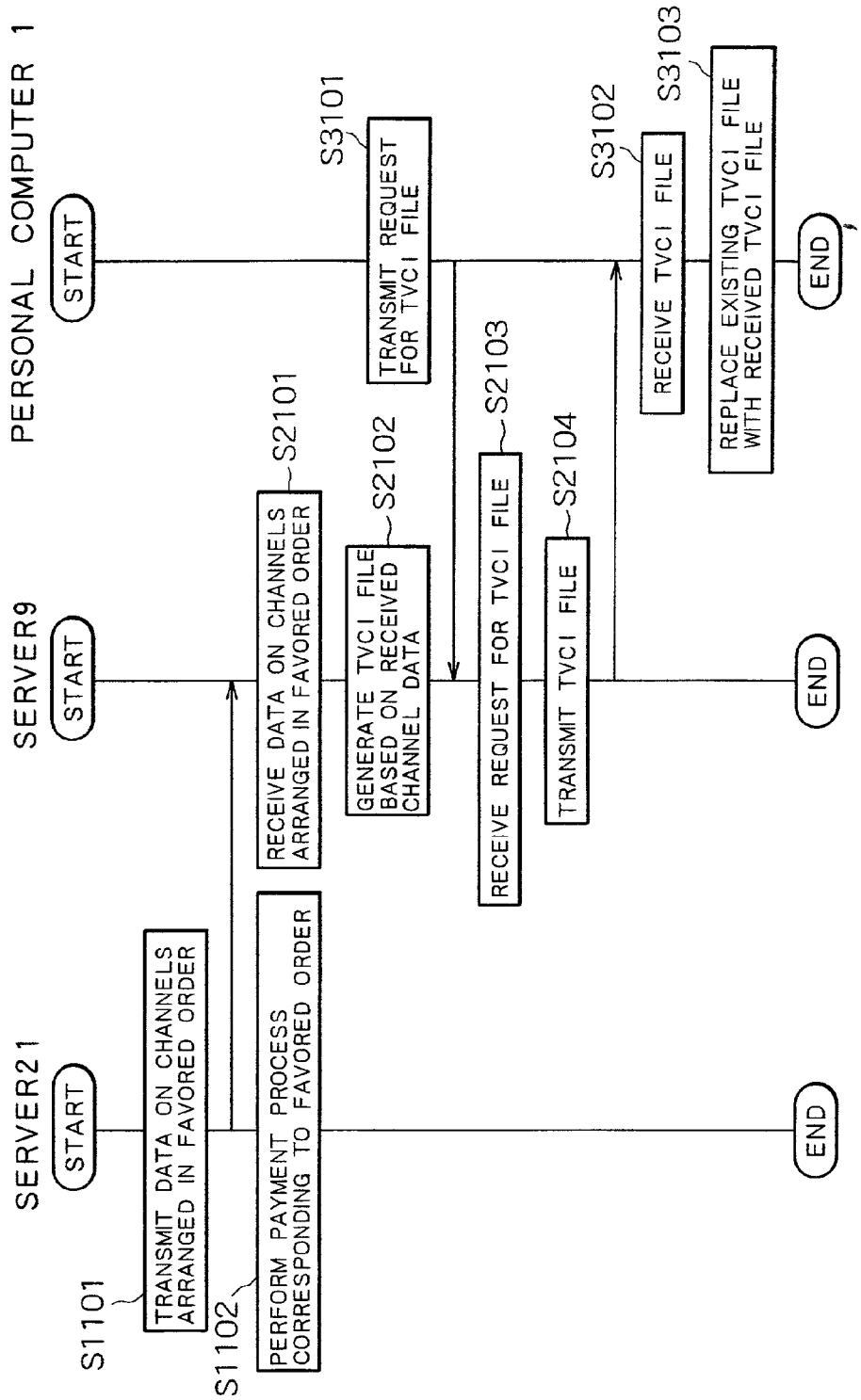
FIG. 27 is a flowchart of steps constituting a process of receiving a TVCI file in which channels are arranged in a favored order.

Described below with reference to the flowchart of FIG. 27 is how a favored order of channels is established based on a TVCI file and how such a TVCI file is received.

In step S1101 of FIG. 27, the server 21 of the TV station 13 transmits to the server 9 the data about channels which are arranged in a favored order and which correspond to the TV station 13 in question. The data are sent to the server 9 over the network 8. In step S1102, the server 21 of the TV station 13 pays a fee to the administrator of the server 9, the fee reflecting the favored order of the channels. More specifically, the server 21 of the TV station 13 may connect to terminal device of a bank, not shown, and may transfer the fee corresponding to the favored channel order to the bank account of the administrator for the server 9 over the network 8.

In step S2101, the communication program 143 of the server 9 causes the communication unit 134 to receive from the server 21 the data about channels arranged in the predetermined favored order. In step S2102, the CPU 121 generates a TVCI file based on the received channel data. The generated TVCI file is written to the database 141.

In step S3101, the communication program 86 of the personal computer 1 causes the communication unit 46 to transmit a request for the TVCI file to the server 9 over the network 8.

In step S2103, the communication program 143 of the server 9 causes the communication unit 134 to receive the TVCI file request coming from the personal computer 1. In step S2104, the server program 142 of the server 9 causes the database 141 to retrieve the TVCI file corresponding to the received request and prompts the communication unit 134 to send the TVCI file in question to the personal computer 1 over the network 8.

In step S3102, the communication program 86 of the personal computer 1 causes the communication unit 46 to receive the TVCI file from the server 9. The communication program 86 supplies the received TVCI file to the recording/reproduction program 81 and unattended recording preset program 84. In step S3103, the communication program 86 substitutes the received TVCI file for the existing TVCI file held illustratively on the HDD 41. This terminates the TCVI file acquisition process. The communication program 86 records the replaced TVCI file as the previous TVCI file on the HDD 41.

As described, on receiving from the server 9 the TVCI file having the favored order of channels established therein, the personal computer 1 replaces the existing TVCI file with the received file. The personal computer 1 retains the replaced TVCI file as the immediately preceding TVCI file.

After the TV station 13 has transmitted to the server 9 the data about channels which are arranged in the favored order and which correspond to the TV station 13 in question, the TV station pays a fee to the administrator of the server 9, the fee reflecting the favored order of the channels.

Figure 28:
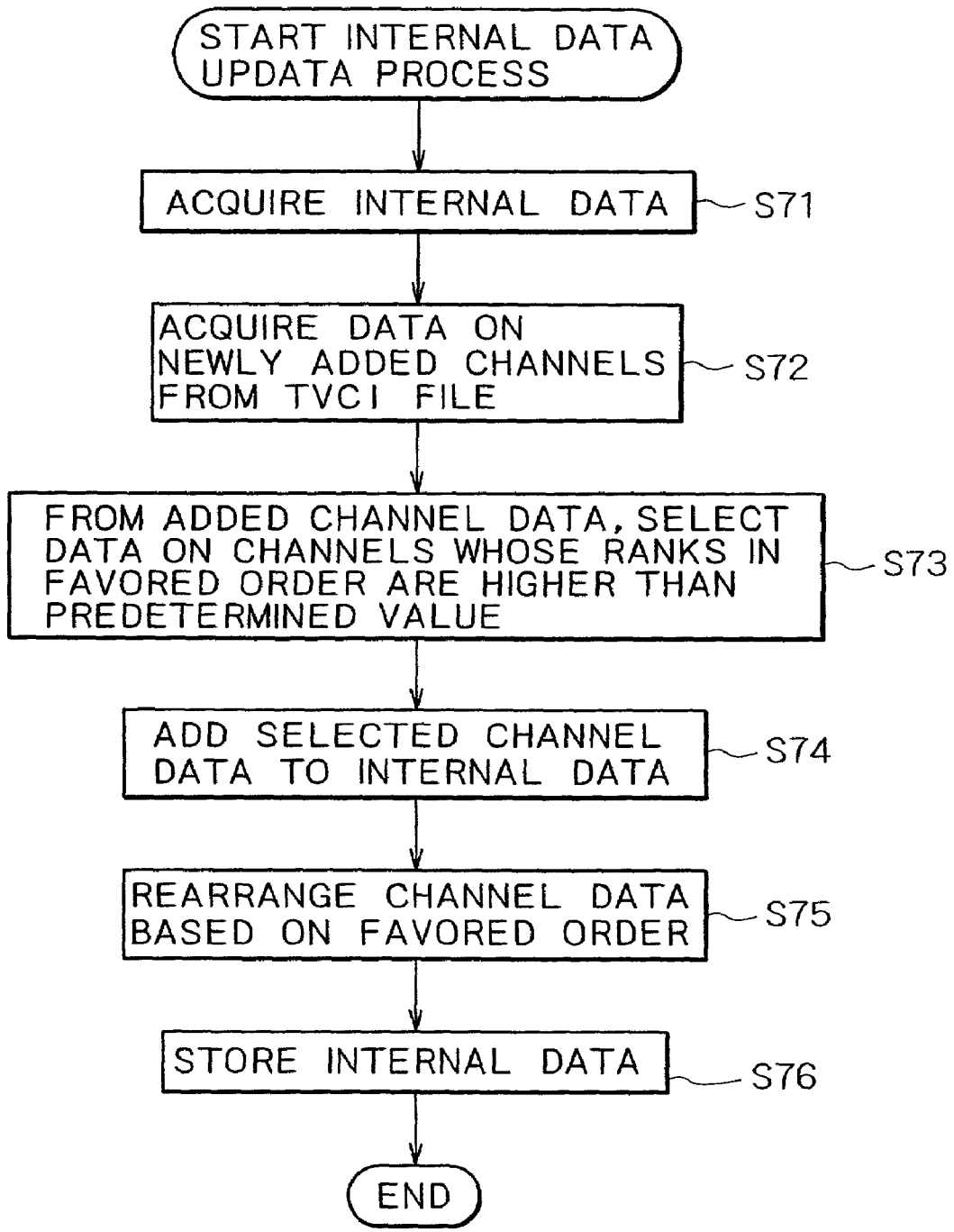
FIG. 28 is a flowchart of steps constituting another internal data update process.

Described below with reference to the flowchart of FIG. 28 is an internal data update process performed by the recording/reproduction program 81 upon receipt of a TVCI file in which a favored order of channels is established.

In step S71, the recording/reproduction program 81 acquires the internal data from within the program 81 itself.

In step S72, the recording/reproduction program 81 compares the immediately preceding TVCI file held on the HDD 41 with the updated TVCI file in order to acquire data about any newly added channels in the updated file.

In step S73, the recording/reproduction program 81 selects the data about each of any newly added channels whose favored ranks are set to be higher than a predetermined value. For example, the recording/reproduction program 81 may select the data about the newly added channels whose favored ranks are higher than 4. The program 81 allows any desired value (in integer) to be set as the reference for the favored order.

In step S74, the recording/reproduction program 81 adds the selected channel data to the internal data.

In step S75, the recording/reproduction program 81 rearranges the channel data based on the favored channel order within the internal data. Illustratively, the program 81 may rearrange the data about the channels in descending order of their favored ranks within the internal data.

In step S76, the recording/reproduction program 81 stores within the program 81 itself the internal data supplemented with the rearranged data about the channels in the favored order.

As described, the personal computer 1 extracts from the updated TVCI file the data about the newly added channels whose favored ranks are higher than a predetermined value and adds the extracted channel data to the internal data. Furthermore, the personal computer 1 rearranges the channel data into a favored order within the internal data. Illustratively, the personal computer 1 may cause the channel selection menu 161 to display the channels arranged in descending order of their favored ranks.

The process above allows the user to select the favorite channels in such a manner that the higher the favored rank of a given channel, the quicker its selection by the user.

The TV station 13, for its part, may raise the ranks of the channels corresponding to the TV programs it distributes. This enhances the chance of having the user of the personal computer 1 watch more of the TV programs the station 13 offers.

Figure 29:
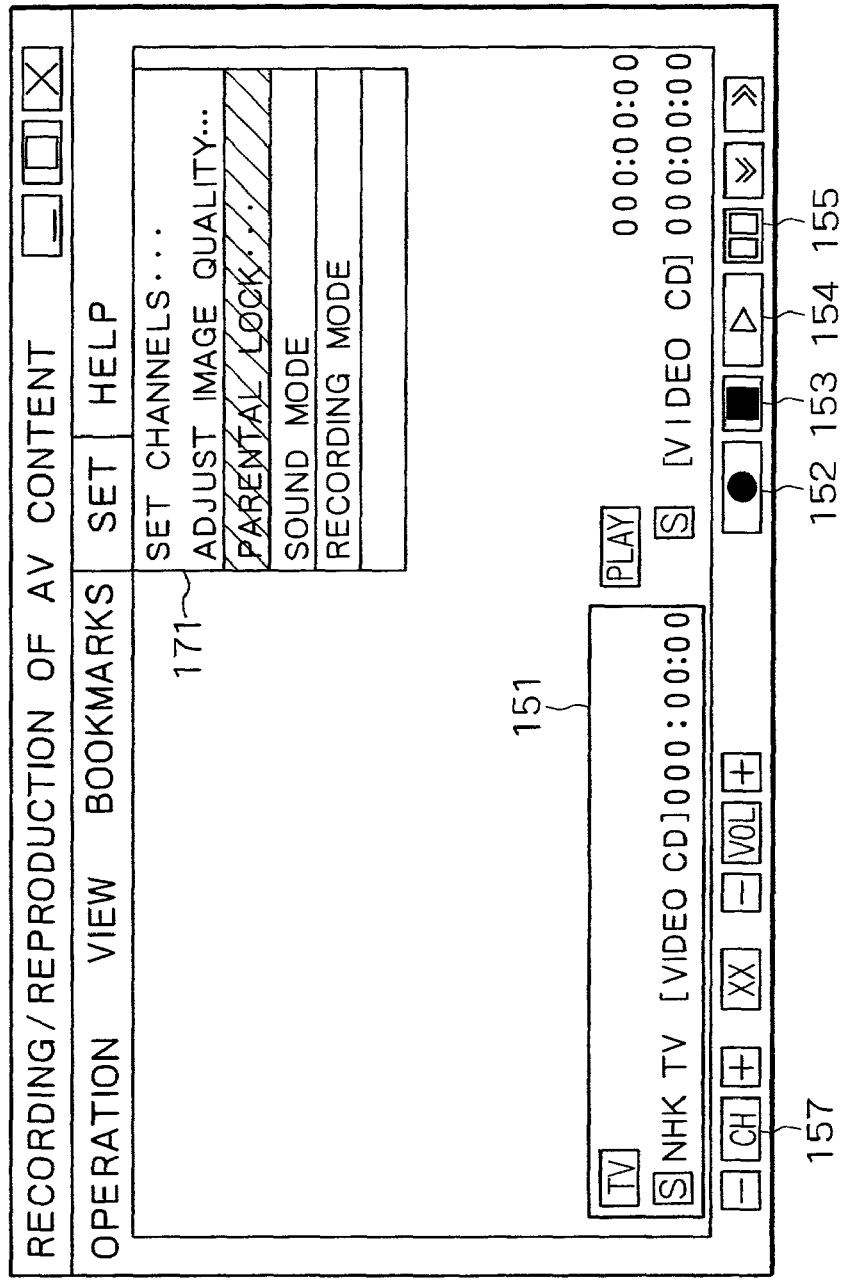
FIG. 29 is an explanatory view of another typical screen displayed by the recording/reproduction program on the monitor.

Below is a description of a parental lock process effected by the personal computer 1. FIG. 29 is an explanatory view of a typical screen displayed by the recording/reproduction program 81 on the monitor 40 of the personal computer 1. A click on the menu named "SET" causes the recording/reproduction program 81 to display on the monitor 40 a setting menu 171 including a channel setting command, an image quality adjusting command, and a parental lock command.

When the parental lock command is selected from the setting menu 171, the recording/reproduction program 81 displays a parental lock setting dialog box on the monitor 40.

FIG. 30 is a schematic view of a typical parental lock setting dialog box displayed on the monitor 40 by the recording/reproduction program 81. The dialog box includes buttons by which to select ratings for specific audiences.

Illustratively, the parental lock setting dialog box of FIG. 30 contains four radio buttons: a first button for selecting TV programs rated for infants (six years of age and younger), a second button for selecting TV programs rated for grade-schoolers (seven years and older), a third button for selecting TV programs rated for teenagers (13 years and older), and a fourth button for turning off parental lock (for those 17 years and older).

The user may illustratively select one of the first radio button (for programs fit for infants), the second radio button (for grade-schoolers), and the third radio button (for teenagers), and click on the OK button. This causes the recording/reproduction program 81 to establish the parental lock rating corresponding to the selected radio button.

The user may alternatively select the fourth radio button for turning off parental lock and click on the OK button. In that case, the recording/reproduction program 81 turns off parental lock.

Figure 31:
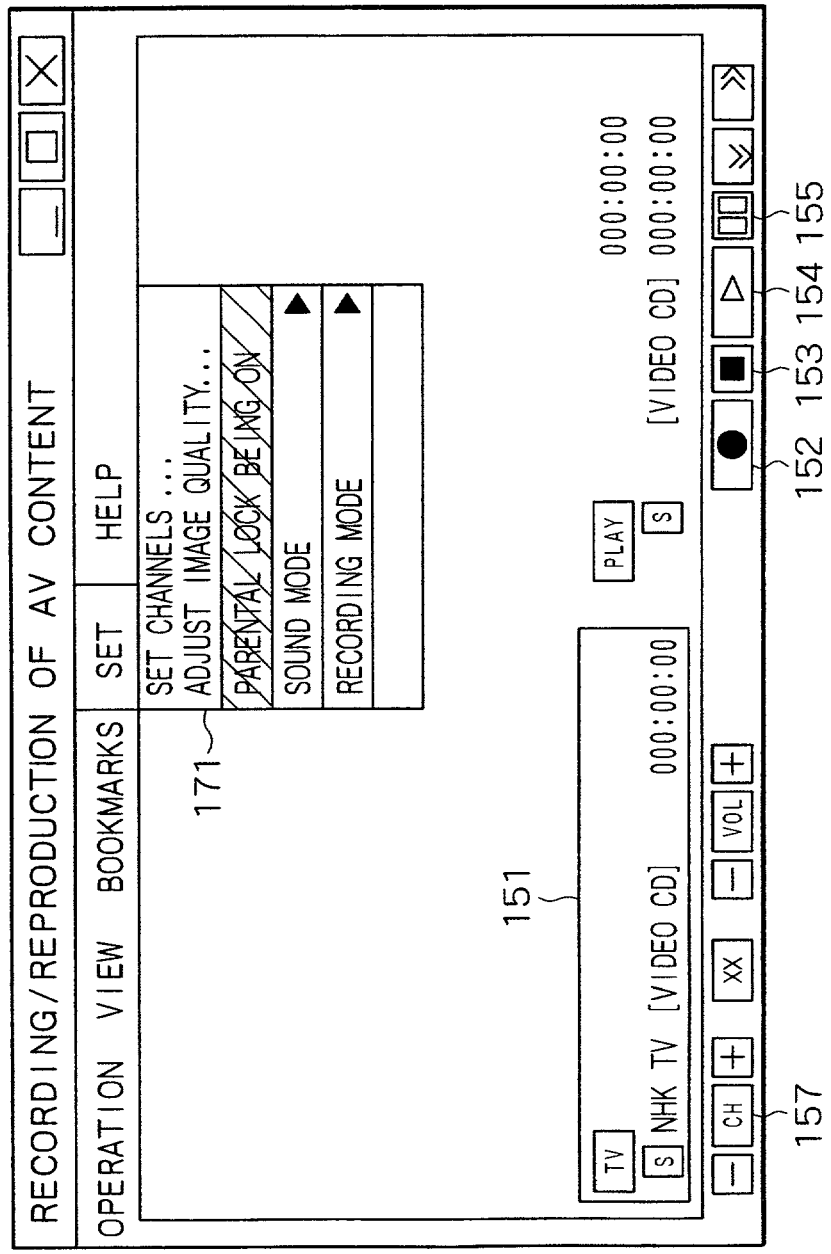
FIG. 31 is an explanatory view of another typical screen displayed by the recording/reproduction program on the monitor.

With one of the ratings selected and with parental lock established, the user may click on the menu named "SET" without pressing any specific keys on the keyboard 128. In that case, the recording/reproduction program 81 erases the indication of the parental lock command from the setting menu 171 and displays a parental lock being-on command in the menu 171, as shown in FIG. 31.

Figure 32:
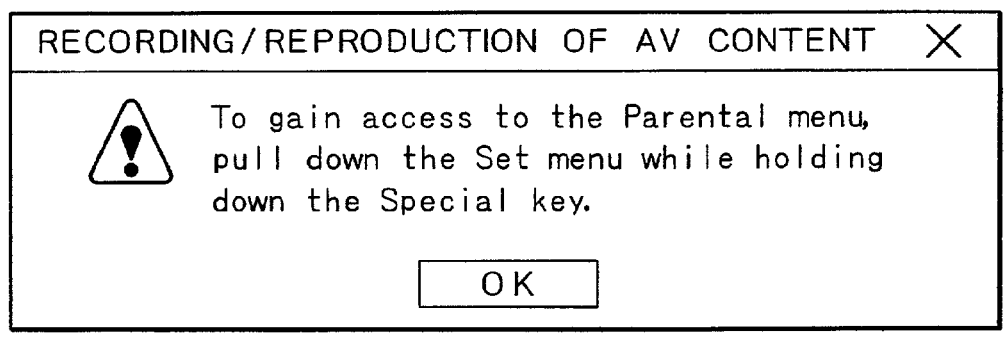
FIG. 32 is a schematic view of a typical caution dialog box.

If the parental lock being-on command is selected in the setting menu 171, the recording/reproduction program 81 displays on the monitor 40 a caution dialog box, not the parental lock setting dialog box, as shown in FIG. 32. The caution dialog box displayed when the parental lock being-on command is selected may illustratively indicate that the user may gain access to parental lock by pulling down the Set menu while holding down specific keys.

Figure 33:
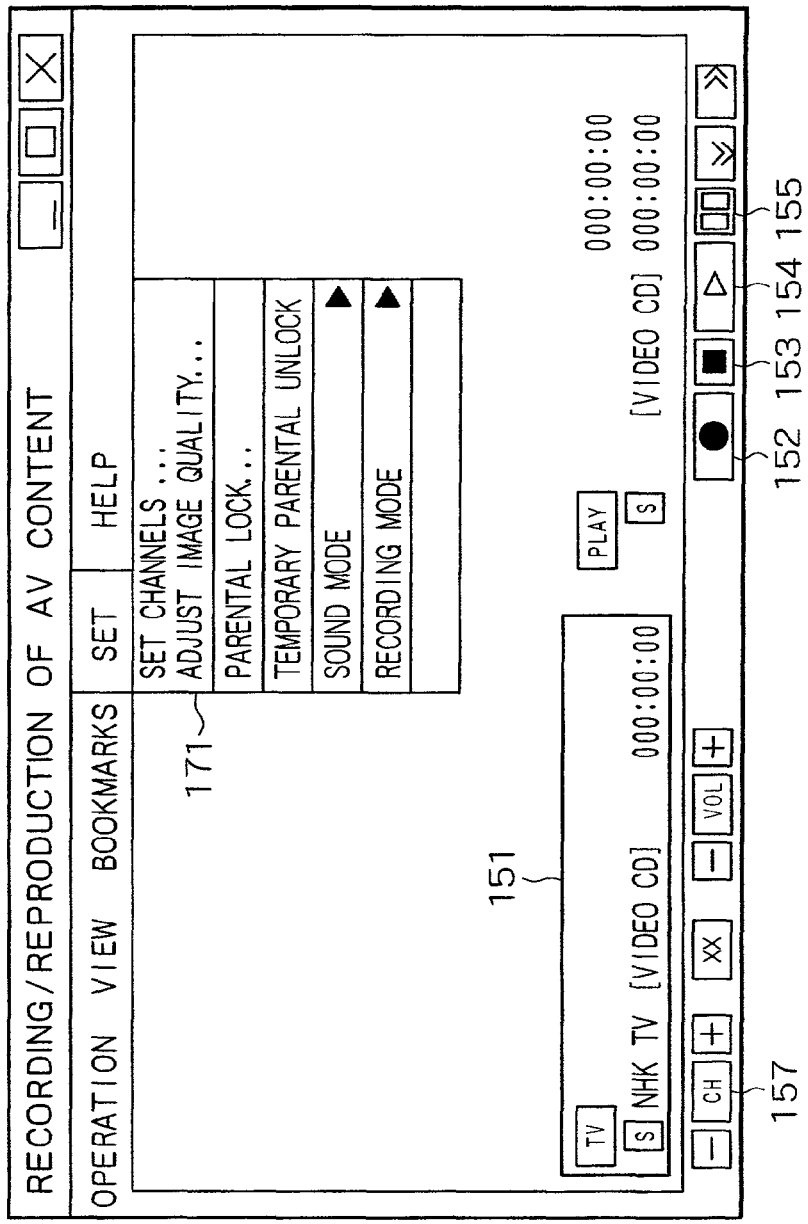
FIG. 33 is an explanatory view of another typical screen displayed by the recording/reproduction program on the monitor.

With one of the ratings selected and with parental lock established, the user may click on the menu named "SET" while holding down specific keys (at least two keys such as the control and shift keys) simultaneously. This causes the recording/reproduction program 81 to erase the indication of the parental lock being-on command from the setting menu 171 and to display the parental lock command and a temporary parental unlock command in the menu 171, as depicted in FIG. 33.

When the parental lock command is selected in the setting menu 171, the recording/reproduction program 81 displays on the monitor 40 the parental lock setting dialog box shown in FIG. 30.

When the temporary parental unlock command is selected in the setting menu 171, the recording/reproduction program 81 temporarily cancels parental lock until the program 81 is restarted.

The process above allows parental lock to be established by only those who know the specific keys for displaying the parental lock command and temporary parental unlock command in the setting menu 171.

Once the temporary parental unlock command is selected, the unlocked state remains effective until the recording/reproduction program 81 is restarted. That means the user may cancel parental lock easily and quickly without performing bothersome operations such as the entry of a password.

The recording/reproduction program 81 sets parental lock automatically once it is started anew. That means the user need not take the trouble to set parental lock every time the user's viewing of TV programs has ended.

Because the recording/reproduction program 81 establishes parental lock automatically once it is restarted, the parents need not worry about forgetting to set parental lock after viewing TV programs. Without this feature, children could inadvertently get to watch harmful programs if their parents forgot to set parental lock.

Figure 34:
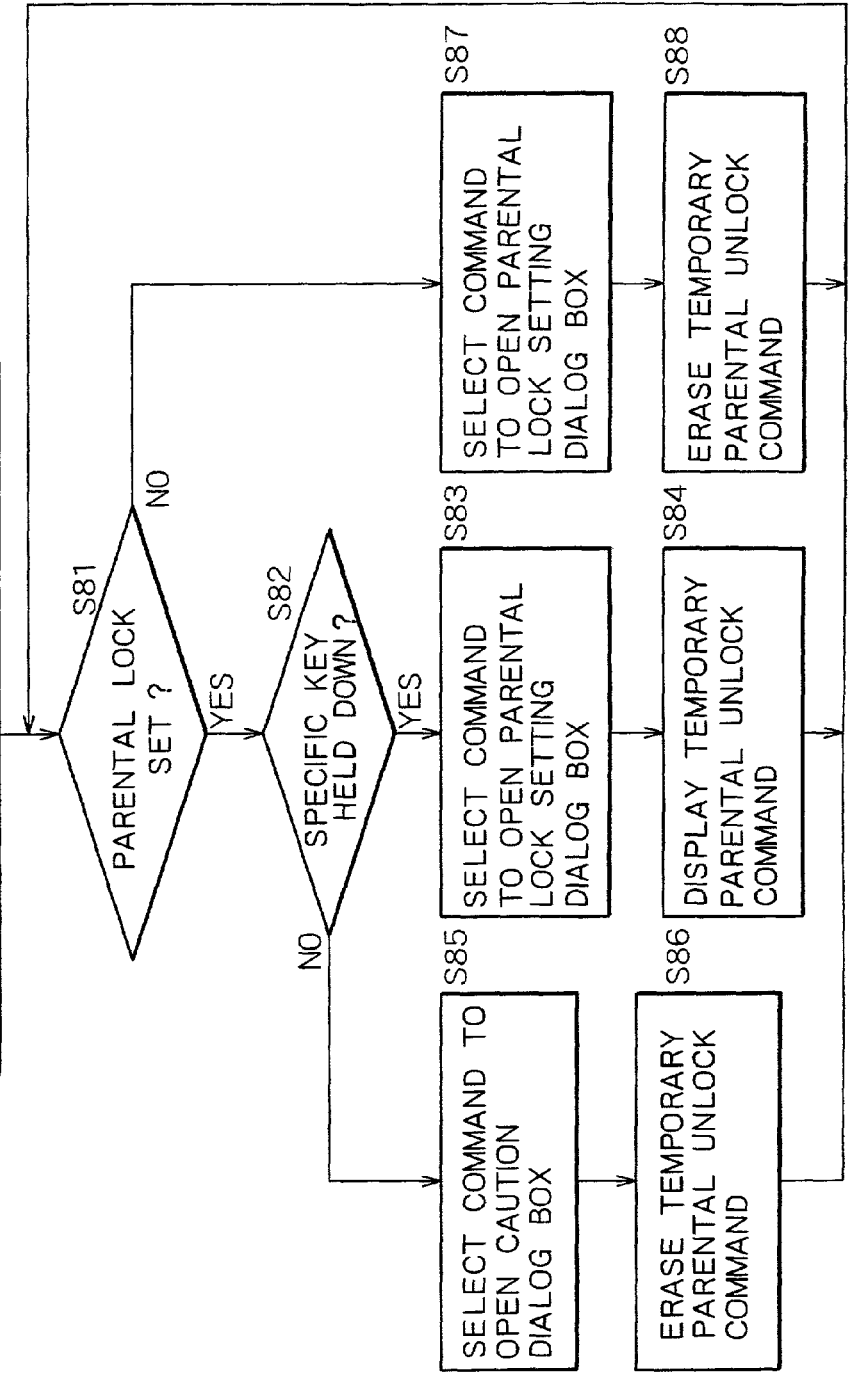
FIG. 34 is a flowchart of steps constituting a process of displaying commands related to parental lock.

Described below with reference to the flowchart of FIG. 34 is a parental lock-related command display process performed by the recording/reproduction program 81.

In step S81, the recording/reproduction program 81 judges if parental lock is set based on internal status data held within the program 81 itself. If parental lock is judged set, step S82 is reached. In step S82, a check is made to see if specific keys, such as the control and shift keys, are held down on the keyboard 38. The specific keys may be selected as desired in the parental lock setting dialog box.

If in step S82 the specific keys on the keyboard 38 are judged held down, then step S83 is reached. In step S83, the recording/reproduction program 81 selects the command to open the parental lock setting dialog box. Step S83 is followed by step S84.

In step S84, the recording/reproduction program 81 displays the temporary parental unlock command in the setting menu 171. Step S84 is followed by step S81, and the judgment on parental lock is repeated.

If in step S82 the specific keys on the keyboard 38 are not judged held down, then step S85 is reached. In step S85, the recording/reproduction program 81 selects the command to open the caution dialog box. Step S85 is followed by step S86.

In step S86, the recording/reproduction program 81 erases the indication of the temporary parental unlock command from the setting menu 171. Step S86 is followed by step S81, and the judgment on parental lock is repeated.

If in step S81 parental lock is not judged set, then step S87 is reached. In step S87, the recording/reproduction program 81 selects the command to open the parental lock setting dialog box in the setting menu 171. Step S87 is followed by step S88.

In step S88, the recording/reproduction program 81 erases the indication of the temporary parental unlock command from the setting menu 171. Step S88 is followed by step S81, and the judgment on parental lock is repeated.

As described, the recording/reproduction program 81 changes the parental lock-related commands in the menu depending on whether or not parental lock has been established and whether or not the specific keys are held down.

The user of the personal computer 1 who knows the specific keys can easily open the parental lock setting dialog box without making bothersome operations such as the input of a password. Children without the knowledge of the specific keys are unable to open the parental lock setting dialog box.

Furthermore, the user of the personal computer 1 who knows the specific keys may temporarily cancel parental lock easily. Children with no knowledge of the specific keys are unable to do so.

Figure 35:
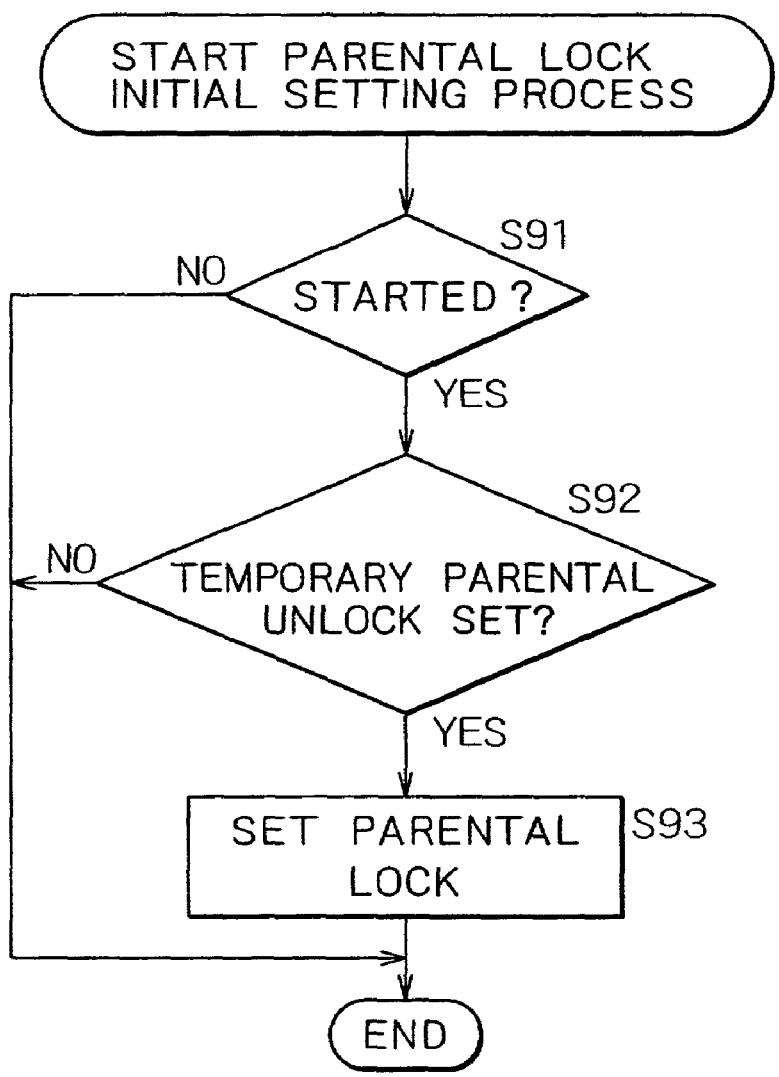
FIG. 35 is a flowchart of steps constituting a parental lock initial setting process.

Described below with reference to the flowchart of FIG. 35 is a parental lock initial setting process carried out by the recording/reproduction program 81.

In step S91, the recording/reproduction program 81 judges if the program 81 itself is started anew based on the status data held inside. If the program 81 is judged started anew, step S92 is reached. In step S92, a check is made to see if temporary parental unlock is set.

In step S92, if temporary parental unlock is judged set, then step S93 is reached. In step S93, based on the internal status data, the recording/reproduction program 81 restores the parental lock rating in effect before temporary parental unlock was established. This terminates the parental lock initial setting process.

In step S91, if the recording/reproduction program 81 is not judged to be started anew, there is no need to set parental lock. In that case, the initial setting process is terminated then and there.

In step S92, if temporary parental unlock is not judged to be set, that means parental lock was not established in the preceding session. In that case, the initial setting process is terminated without establishment of parental lock.

As described above, where temporary parental unlock was set in the preceding session, the recording/reproduction program 81 establishes parental lock once it is started anew.

Figure 36:
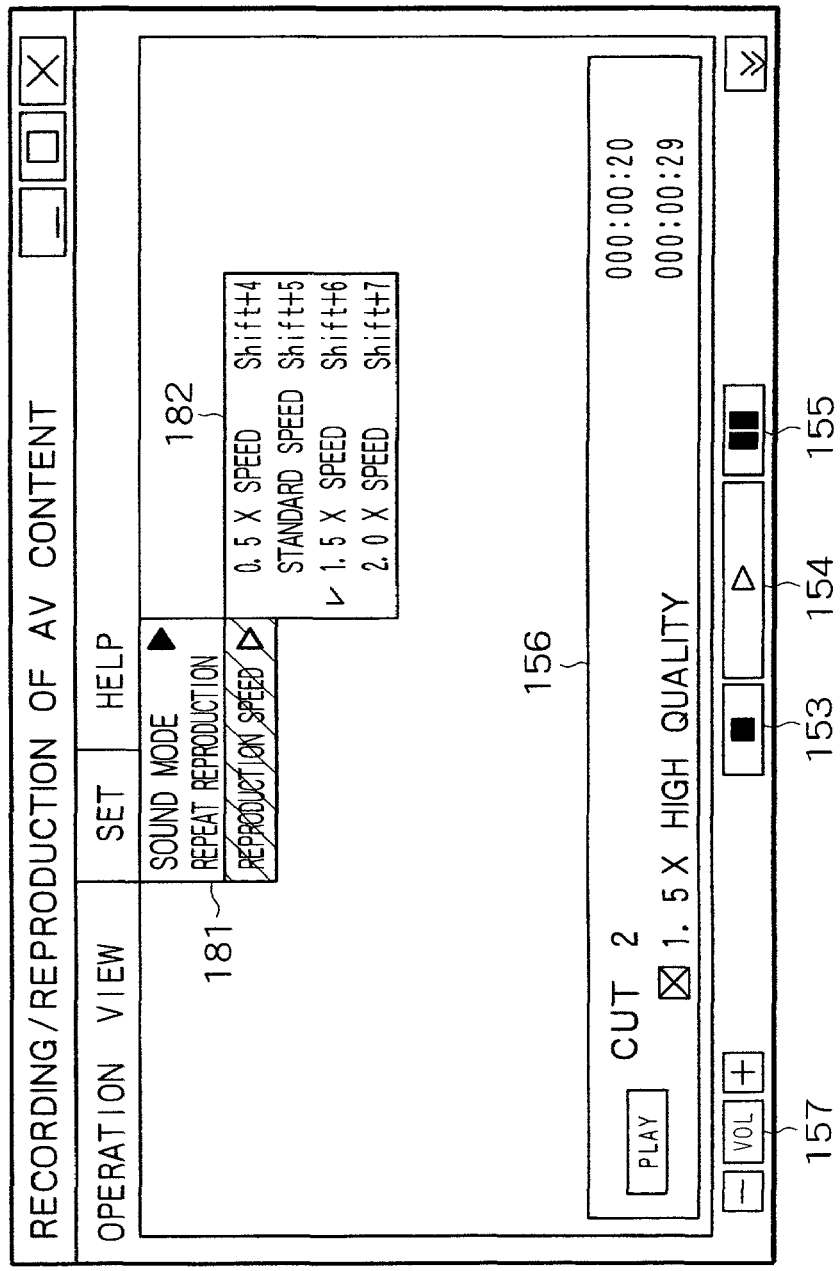
FIG. 36 is an explanatory view of another typical screen displayed by the recording/reproduction program on the monitor.

Below is a description of how the recording/reproduction program 81 changes the speed at which the recorded AV content 101 is reproduced. FIG. 36 is an explanatory view of another typical screen displayed by the recording/reproduction program 81 on the monitor 40 of the personal computer 1. The typical screen of FIG. 36 does not include dedicated buttons for fast forward or slow playback.

A click on the menu named "SET" causes the recording/reproduction program 81 to display on the monitor 40 a setting menu 181 including a sound mode setting command, a repeat reproduction command, and a reproduction speed command.

Selecting the reproduction speed command in the setting menu 181 causes the recording/reproduction command 81 to display a sub-menu 182 for selecting a reproduction speed. In the example of FIG. 36, the submenu 182 includes a 0.5× speed reproduction command, a standard speed reproduction command, a 1.5× speed reproduction command, and a 2.0× speed reproduction command.

If the 0.5× speed reproduction command is selected in the sub-menu 182, the recording/reproduction program 81 permits 0.5× speed reproduction of the AV content 101.

Selection of the standard speed reproduction command in the sub-menu 182 causes the recording/reproduction program 81 to effect standard speed reproduction of the AV content 101.

Selecting the 1.5× speed reproduction command in the sub-menu 182 prompts the recording/reproduction program 81 to reproduce the AV content 101 at 1.5× speed.

When the 2.0× speed reproduction command is selected in the sub-menu 182, the recording/reproduction program 81 executes reproduction of the AV content 101 at 2.0× speed.

In the example of FIG. 36, a check mark on the left-hand side of the 1.5× speed reproduction command indicates that the AV content 101 is reproduced at 1.5× speed. The reproduction window 156 gives an indication that the AV content 101 is reproduced at 1.5× speed.

If the AV content 101 is not reproduced or if the reproduction is temporarily stopped, clicking on the play button 154 causes the recording/reproduction program 81 to start or resume reproduction of the AV content 101 in question.

Figure 37:
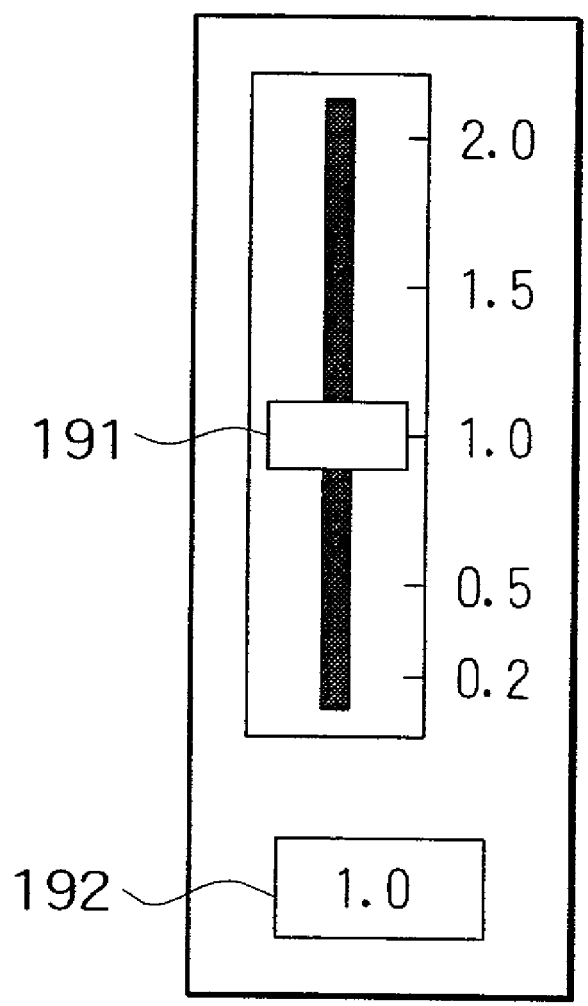
FIG. 37 is a schematic view of a typical reproduction speed varying window.

While the AV content 101 is being reproduced, clicking on the play button 154 in inactive state prompts the recording/reproduction program 81 to display a reproduction speed changing window on the monitor 40. This window, an example of which is shown in FIG. 37, is a screen on which the reproduction speed for the AV content 101 may be varied in stepless fashion.

The reproduction speed changing window for continuously adjusting the reproduction speed of the AV content 101 includes a slider bar 191. Dragging the slider bar 191 upward or downward as seen in FIG. 37 causes the recording/reproduction program 81 to continuously vary the content reproduction speed in keeping with the displayed position of the slider bar 191 within the window.

The reproduction speed changing window also includes a button 192 for reproducing the AV content 101 at a predetermined speed. The standard speed may be set illustratively to the button 192. In such a case, clicking on the button 192 causes the recording/reproduction program 81 to reproduce the AV content at standard speed. The speed corresponding to the button 192 may be set as desired illustratively by double-clicking the button 192 and then entering the value of the desired speed from the keyboard 38.

As described, while the AV content 101 is being reproduced, simply clicking on the inactive play button 154 causes the recording/reproduction program 81 to display the reproduction speed changing window. This window allows the reproduction speed for the AV content 101 to be varied as desired in a continuous manner.

Moreover, simply dragging the slider bar 191 upward or downward in the window prompts the recording/reproduction program 81 to set the desired speed at which to reproduce the AV content 101.

Figure 38:
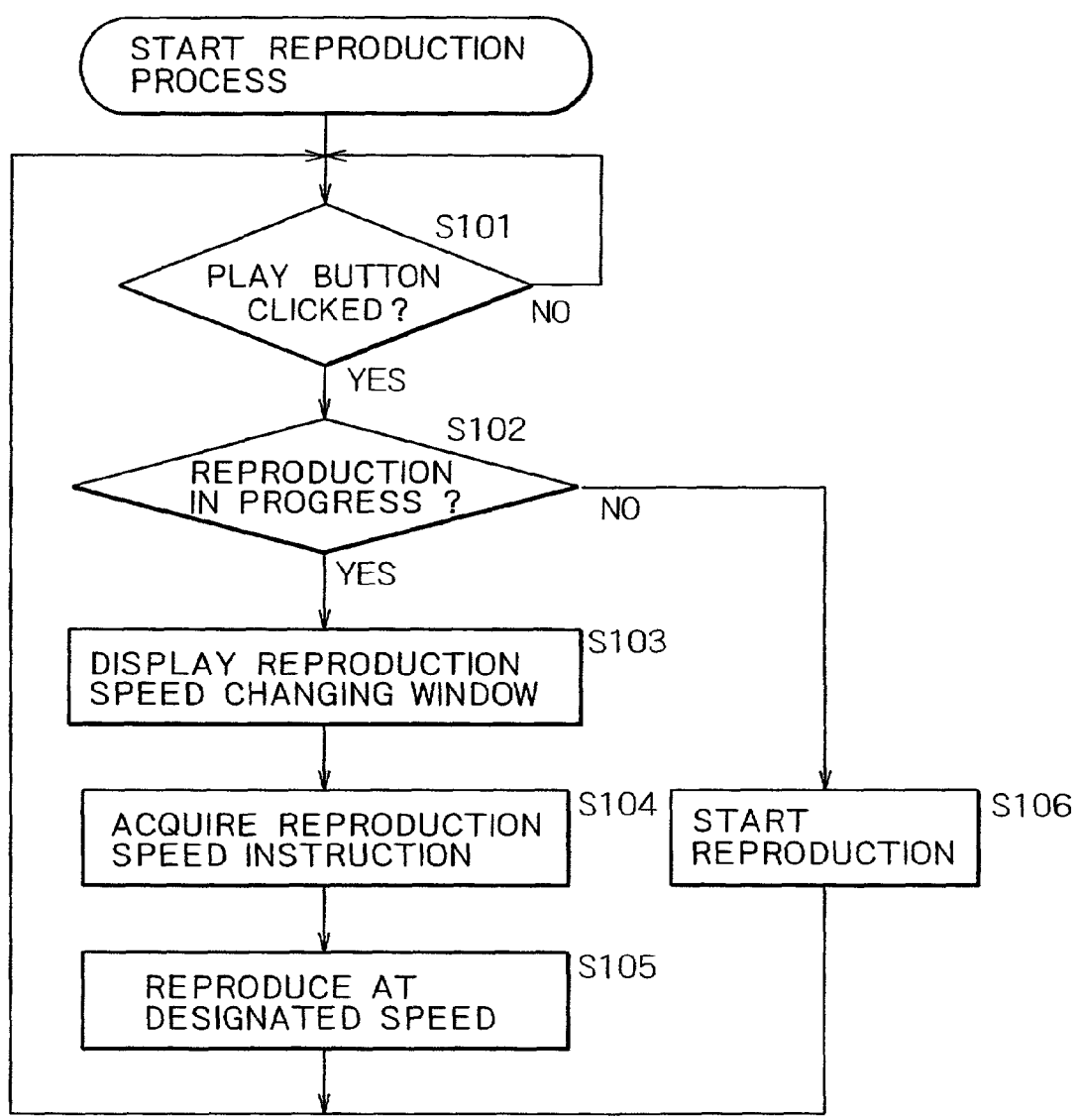
FIG. 38 is a flowchart of steps constituting an AV content reproduction process.

What follows with reference to the flowchart of FIG. 38 is a description of how the recording/reproduction program 81 reproduces the AV content 101. In step S101, based on a signal coming from the mouse 39, the recording/reproduction program 81 judges whether the play button 154 displayed on the monitor 40 is clicked on. If the play button 154 is not judged clicked on, step S101 is reached again. The judging step is repeated until the play button 154 is clicked on.

If in step S101 the play button 154 is judged clicked on, step S102 is reached. In step S102, the recording/reproduction program 81 judges whether the AV content 101 is being reproduced on the basis of internal status data held within the program 81 itself.

If in step S102 the AV content 101 is judged being reproduced, step S103 is reached. In step S103, the recording/reproduction program 81 displays a reproduction speed changing window on the monitor 40. In step S104, based on the signal from the mouse 39, the recording/reproduction program 81 acquires a reproduction speed instruction corresponding to the displayed position of the slider bar 191 within the reproduction speed changing window.

In step S105, the recording/reproduction program 81 reproduces the AV content 101 at the designated reproduction speed based on the reproduction speed instruction acquired in step S104. Step S105 is followed by step S101, and the judging process is repeated.

While the reproduction speed changing window is being displayed on the monitor 40, the recording/reproduction program 81 repeats step S104 in which to acquire a reproduction speed instruction as well as step S105 in which to reproduce the AV content 101 at the speed designated in step S105.

If in step S102 the AV content 101 is not judged reproduced, then step S106 is reached in which the recording/reproduction program 81 reproduces the AV content 101. Step S106 is followed by step S101, and the judging process is repeated.

As described above, while the AV content 101 is being reproduced, simply clicking on the inactive play button 154 causes the recording/reproduction program 81 to display the reproduction speed changing window.

In addition, simply dragging the slider bar 91 upward or downward in the window prompts the recording/reproduction program 81 to continuously vary the reproduction speed of the AV content 101. As a result, the AV content 101 can be produced quickly at the required speed.

Because simply clicking on the inactive play button 154 provides display of the reproduction speed changing window, there is no need for an extensive display area for displaying the menu. This eliminates the need for dedicated buttons by which to effect fast forward or slow playback.

The absence of the need to select a sub-menu command signifies no need for precisely controlled manipulations such as the movement of a pointer from the reproduction speed command in the setting menu 181 to the sub-menu 182. This allows those who are not familiar with the operation of the mouse 39 to readily change the reproduction speed for the AV content 101. In particular, where the personal computer 1 is a notebook-sized one that may be operated while being carried around, the feature above allows the user easily to change the speed at which to reproduce the AV content 101.

Alternatively, upon a click on the inactive play button 154, the recording/reproduction program 81 may display an edit box in which to accept an input value. Based on the input value, the program 81 may change the reproduction speed for the AV content 101.

As another alternative, the recording/reproduction program 81 may change the speed at which to reproduce the AV content 101 on the basis of the displayed position at which the inactive play button 154 is clicked on. Illustratively, if a leftward-side position of the play button 154 is clicked on, the recording/reproduction program 81 may be arranged to raise the reproduction speed; a click on a rightward-side position of the play button 154 may prompt the program 81 to reduce the reproduction speed. In such a case, clicking on the rightmost position of the play button 154 may cause the recording/reproduction program 81 to bring reproduction of the AV content 101 to a temporary halt. This arrangement, if implemented, will eliminate the need for the pause button 155.

As a further alternative, the recording/reproduction program 81 may boost the reproduction speed when a rightward-side position of the play button 154 is clicked on and reduce the speed when a leftward-side position of the play button 154 is clicked on.

The recording/reproduction program 81 may also be arranged to display the reproduction speed for the AV content 101 inside the play button 154.

As another alternative, the broadcasting system according to the invention may be so modified as to deal with only sounds.

In connection with the inventive broadcasting system above, the personal computer 1 was described as receiving, recording, and reproducing broadcast programs. However, this is not limitative of the invention. Alternatively, the personal computer 1 may be replaced by any suitable device of any suitable type: a stand-alone PC, a portable PC, a PDA (Personal Digital Assistant), etc.

The above broadcasting system of the invention was described as having the personal computer 1 receive ground waves, and the set-top box receive radio waves via the satellite 11. Alternatively, the broadcasts may be received via a cable television system or over the network 8. That is, the invention is not limited by any specific communication medium used for broadcasting purposes.

The series of steps described above may be executed either by hardware or by software. For software-based processing to take place, programs constituting the software may be either incorporated beforehand in dedicated hardware or installed upon use from a suitable program storage medium into a general-purpose personal computer or like equipment capable of executing diverse functions.

As shown in FIG. 2 or FIG. 7, the storage medium is offered to users apart from the computer not only as a package medium constituted by the magnetic disc (including floppy discs) 47 or 135, optical disc (including CD-ROM (Compact Disc-Read Only Memory) and DVD (Digital Versatile Disc)) 48 or 136, magneto-optical disc (including MD (Mini-disc), a registered trademark) 49 or 137, or semiconductor memory 50 or 138; but also in the form of the ROM 32 or 122 or the HDD 41 or 131 containing the programs and incorporated beforehand in the computer.

A program or programs constituting the series of steps described above may be installed as needed into the computer for execution, carried by wired or wireless communication means such as local area networks, the Internet, and digital satellite broadcasting networks and forwarded through communication interfaces such as routers and modems.

In this specification, the steps which are stored on a program storage medium and which describe the programs to be executed represent not only the processes that are carried out in the depicted sequence (i.e., on a time series basis) but also the processes that are conducted parallelly or individually.

In this specification, the term "system" refers to an entire configuration made up of a plurality of component devices.

While a preferred embodiment of the present invention has been described using specific terms, such description is for illustrative purposes only, and it is to be understood that changes and variations may be made without departing from the spirit or scope of the following claims.

What is claimed is:

1. A system comprising a personal computer and a server on a network, said personal computer comprising:
a first communication unit configured to send a request for TV information data via the network to said server on the network and to receive said TV information data from said server via the network, wherein said received TV information data includes (a) channel data denoting channel numbers, (b) names of channels of TV programs distributed by at least one provider and (c) information denoting provider display priority of each channel number received;
a first storage unit configured to store at least said received TV information data; and
a controller configured to acquire data on newly added channels by a comparison of (a) said channel data in the received TV information data corresponding to newly added channel data and (b) previously acquired channel data stored in said first storage unit, to select data on the newly added channels whose rank in provider favored order are higher than a predetermined value, to add the selected channel data to internal data, to rearrange the channel data based on a user favored order and to store the rearranged channel data as the internal data, the internal data specifying the channel numbers, and the names of said channels based on the provider display priority having a rank higher than the predetermined value, and said controller configured to control reception of said TV programs by selecting said channels based on said internal data;

said server on the network comprising:

a second storage unit configured to store said TV information data, separately for each TV program provider and each TV station provider, including a version number and information denoting any change in one of channel numbers and names of channels from a prior version number; and a second communication unit configured to send said TV information data, in a predetermined provider display order determined by said at least one provider, to said personal computer apparatus via the network on receipt of said request from said communication unit of said personal computer.

2. A personal computer comprising:

a first communication unit configured to send a request for TV information data to a server via a network and to receive said TV information data from said server via the network, wherein said received TV information data includes channel data denoting channel numbers, names of channels of TV programs distributed by at least one provider and information denoting provider display priority of each channel number;

a first storage unit configured to store at least said TV information data; and a controller configured to acquire data on newly added channels by a comparison of (a) said channel data in the received TV information data corresponding to newly added channel data and (b) previously channel data stored in said first storage unit, to select data on the newly added channels whose rank in provider favored order are higher than a predetermined value, to add the selected channel data to internal data, to rearrange the channel data based on a user favored order and to store the rearranged channel data as the internal data, the internal data specifying the channel numbers, and the names of said channels based on the provider display priority having a rank higher than the predetermined value, and said controller configured to control reception of said TV programs by selecting said channels based on said internal data.

3. The personal computer according to claim 2, wherein said controller rearranges said channel data based on said information denoting display priority of each of said channels.

4. The personal computer according to claim 2, wherein said TV information data further includes a zip code denoting a territory in which said provider distributes TV programs.

5. A method of processing information by a personal computer comprising the steps of:

sending a request for TV information data via a network to a server on the network, wherein said TV information data includes (a) channel data denoting channel numbers, (b) names of channels of TV programs distributed by at least one provider, (c) information denoting display priority of each channel number, (d) version number, (e) information denoting any change in one of (1) channel numbers and (2) names of channels from a prior version number, and (f) favorite flag denoting whether data about the corresponding channel are to be displayed in a channel selection menu;

receiving said TV information data from said server via the network; and acquiring data on newly added channels by a comparison of (a) said channel data in the received TV information data corresponding to newly added channel data and (b) previously acquired channel data, selecting data on the newly added channels whose rank in provider favored order are higher than a predetermined value, adding the selected channel data to internal data, rearranging the channel data based on a user favored order and storing the rearranged channel data as the internal data.

6. The method according to claim 5, further comprising the step of:

replacing said received TV information data with an existing data held on a storage device.

7. The method according to claim 6, further comprising the step of:

recording the replaced TV information data as original data on said storage device.

8. The method according to claim 5, further comprising the step of:

rearranging said channel data based on said information denoting display priority of each of said channels.

9. The method according to claim 5, wherein said TV information data further includes a zip code denoting a territory in which said provider distributes TV programs.

* * * * *